United States Patent
Tiedemann, Jr. et al.

(10) Patent No.: US 6,216,004 B1
(45) Date of Patent: Apr. 10, 2001

(54) CELLULAR COMMUNICATION SYSTEM WITH COMMON CHANNEL SOFT HANDOFF AND ASSOCIATED METHOD

(75) Inventors: Edward G. Tiedemann, Jr.; Sandip Sarkar, both of San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/115,217

(22) Filed: Jul. 13, 1998

(51) Int. Cl.[7] ........................................ H04Q 7/20
(52) U.S. Cl. .................... 455/442; 455/458; 455/434; 370/331
(58) Field of Search .................... 455/442, 443, 455/458, 517, 524, 525, 522, 67.1, 434; 370/331, 332

(56) References Cited

U.S. PATENT DOCUMENTS

| | | |
|---|---|---|
| 4,401,307 | 8/1983 | Dechavanne . |
| 5,056,109 | 10/1991 | Gilhousen et al. . |
| 5,101,501 | 3/1992 | Gilhousen et al. . |
| 5,103,459 | 4/1992 | Gilhousen et al. . |
| 5,109,390 | 4/1992 | Gilhousen et al. . |
| 5,267,261 | 11/1993 | Blakeney, II et al. . |
| 5,490,165 | 2/1996 | Blakeney, II et al. . |
| 5,604,744 * | 2/1997 | Andersson et al. ................ 370/95.1 |
| 5,625,876 | 4/1997 | Gilhousen et al. . |
| 5,640,414 * | 6/1997 | Blakeney, II et al. ................ 375/200 |
| 5,848,063 * | 12/1999 | Tiedemann, Jr. et al. ........... 455/436 |
| 5,920,821 * | 7/1999 | Seazholtz et al. .................... 455/466 |
| 5,987,326 * | 11/1999 | Tiedemann, Jr. et al. ........... 455/442 |
| 5,999,816 * | 12/1999 | Tiedemann, Jr. et al. ........... 444/437 |

OTHER PUBLICATIONS

TIA/EIA Standard (TIA/EIA–95–B), "Mobile Station–Base Station Compatibility Standard for Dual Mode Wideband Spread Spectrum Cellular System," Default Ballot Version Jul. 17, 1998, vol. 1.

Viterbi, A.J., "CDMA, Principles of Spread Spectrum Communication," Addison–Wesley Publishing Company, pp. 181, 183–184, 198–199, 222–224, (1995).

* cited by examiner

Primary Examiner—Edward F. Urban
Assistant Examiner—Tilamun Gesesse
(74) Attorney, Agent, or Firm—Philip R. Wadsworth; Roger W. Martin; S. Hossain Beladi

(57) ABSTRACT

A cellular communications system comprising;
 a mobile unit which designates an active set of base stations;
 a base station; and
 a base station controller which puts the base stations in the active set in common channel soft handoff.

20 Claims, 13 Drawing Sheets

MOBILE UNIT

CELLULAR COMMUNICATION SYSTEM WITH COMMON CHANNEL SOFT HANDOFF AND ASSOCIATED METHOD

CROSS-REFERENCE TO RELATED APPLICATION

This application claims priority to a provisional application filed Jun. 23, 1998 entitled PAGING CHANNEL SOFT HANDOFF, assigned Application Ser. No. 60/090,357.

BACKGROUND OF THE INVENTION

1. Field of the Invention

The invention relates in general to digital cellular communication systems, and more particularly, to soft handoff in spread spectrum communication systems.

2. Description of the Related Art

In a code division multiple access (CDMA) spread spectrum communication system, a shared frequency band is used for communication with all base stations within that system. An example of such a system is described in the TIA/EIA Standard TIA/EIA-95-B entitled "Mobile Station-Base Station Compatibility Standard for Dual Mode Wideband Spread Spectrum Cellular System", incorporated herein by reference. The generation and receipt of CDMA signals is disclosed in U.S. Pat. No. 4,401,307 entitled "SPREAD SPECTRUM MULTIPLE ACCESS COMMUNICATION SYSTEMS USING SATELLITES OR TERRESTRIAL REPEATERS" and in U.S. Pat. No. 5,103,459 entitled "SYSTEM AND METHOD FOR GENERATING WAVEFORMS IN A CDMA CELLULAR TELEPHONE SYSTEM", both of which are assigned to the assignee of the present invention and incorporated herein by reference.

Radio Frequency (RF) signals are exchanged between a respective mobile unit and one or more base stations. Mobile units do not communicate directly with one another. Base stations communicate with a base station cellular or personal communication system controller, referred to herein as a base station controller (BSC) using various media such as ground based wires or a microwave link, for example. The BSC can route calls to a public switching telephone network (PSTN) or can route packets to a packet switched network, such as the Internet. The base station also coordinates the operation of base stations within the system during soft handoff for example.

TIA/EIA-95 is one example of a CDMA communication system. Communication from a mobile unit to one or more base stations in a TIA/EIA-95 CDMA system takes place over shared frequency channels each of which occupies approximately 1.25 MHz of radio frequency bandwidth. More specifically, communication signals occupying a given frequency band are discriminated at a receiving station through the spread spectrum CDMA waveform properties based on the use of a high rate pseudonoise (PN) code. A PN code is used to modulate signals transmitted from the base stations and mobile units. Signals from different base stations can be separately received at a given mobile unit by discrimination of different PN codes. For the TIA/EIA-95 standard, these codes are constructed from a single code, but each base station has a unique time offset of the PN code. The high rate PN spreading also allows a receiving station to receive a signal from a single transmission station where the signal has traveled over distinct propagation paths. Demodulation of multiple signals is disclosed in U.S. Pat. No. 5,490,165 entitled "DEMODULATION ELEMENT ASSIGNMENT IN A SYSTEM CAPABLE OF RECEIVING MULTIPLE SIGNALS" and in U.S. Pat. No. 5,109,390 entitled "DIVERSITY RECEIVER IN A CDMA CELLULAR TELEPHONE SYSTEM", both of which are assigned to the assignee of the present invention and incorporated herein by reference.

The various channels within a given "forward" (base station to mobile unit) TIA/EIA-95 CDMA channel include data channels, a synchronization channel, a pilot channel, and a set of paging channels, all transmitted from the base station to mobile units. The pilot channel carries a pilot signal that is a regularly repeated pattern that is differently phase offset for each base station. The pilot provides for time reference and for amplitude and phase tracking. The pilot signal allows mobile units to identify and become synchronized with the various base stations that are within range of their communication capability. The synchronization channel carries additional synchronization information for use by mobile units. The set of data channels carry the data associated with the various communication sessions (usually phone calls) and are directed to individual mobile units. These data channels are called traffic channels in TIA/EIA-95. The paging channels are used by the base stations to notify mobile units when a request to communicate has been received.

The protocol for paging a subscriber unit typically is defined so as to evenly distribute power transmitted by the base station over time, and to reduce power consumption in the mobile unit. In some CDMA systems, the mobile unit power consumption while monitoring the paging channel is reduced by dividing each base station's paging channel into a set of paging "slots" or time windows during which paging signals directed to mobile units may be generated, and by assigning a particular CDMA frequency channel, paging channel and paging slot to each mobile unit in an evenly distributed fashion. This assignment generally may be performed, for example, via the use of a hashing function applied to the International Mobile Station Identity (IMSI) assigned to each mobile unit, although other unique numbers could be utilized. The hashing function of set of hashing functions yields a value that corresponds to a particular set of paging parameters including a CDMA channel, paging channel, and paging slot. Mobile units are then configured to "listen" for a paging message over their assigned CDMA frequency channel and paging channel during the corresponding paging slot. Since listening for a page requires a certain amount of power, limiting the time a mobile unit performs the listening function to a particular paging slot reduces the overall power consumption of that mobile unit and therefore increases the life of any battery or other power storage system utilized by that mobile unit.

During a mode of operation called "soft handoff", the mobile station simultaneously exchanges identical communications traffic on a CDMA traffic channel between two or more different base stations. In the case of (forward link) reception by a mobile station, the signals from the multiple base stations can be coherently combined to improve performance, as with multipath combining. In fact, the second base station signal can be regarded as a delayed version of the first, generated actively and purposely, rather than as a delayed reflection of the first caused by the environment. See, *CDMA, Principles of Spread Spectrum Communication,* by Andrew J. Viterbi, Addison-Wesley Pub. Co., 1995, pp. 181, 183–184, 198–199 and 222–224. Soft handoff is further disclosed in U.S. Pat. No. 5,101,501 entitled "SOFT HANDOFF IN A CDMA CELLULAR TELEPHONE SYSTEM" and U.S. Pat. No. 5,267,261 entitled MOBILE STATION ASSISTED SOFT HANDOFF IN A CDMA CELLULAR COMMUNICATIONS SYSTEM", both assigned to the assignee of the present invention and incorporated herein by reference. Similarly, a mobile unit can simultaneously communicate with two sectors of the same base station, known as softer handoff, as disclosed in copending U.S. Pat. No. 5,625,876 entitled "METHOD AND APPARATUS FOR PERFORMING HANDOFF BETWEEN SECTORS OF A COMMON BASE STATION", assigned to the assignee of the present invention and incorporated herein by reference. Handoffs are described as soft and softer because they make the new connection before breaking the existing one.

In a typical CDMA communication system, mobile unit assisted soft handoff operates based on the pilot signal strength of several sets of base stations as measured by the mobile unit. In the TIA/EIA-95 CDMA communication system, for example, an Active Set is the set of base stations through which active communication is established. A Neighbor Set is a set of base stations surrounding an active base station comprising base stations that have a high probability of having a pilot signal strength of sufficient level to establish communication. A Candidate Set is a set of base stations having a pilot signal strength of sufficient level to establish communication.

In at least one earlier CDMA system, for example, soft handoff can be set up between a mobile unit and two or more base stations in the mobile unit's Active Set. For instance, in such an earlier CDMA system, when communications are initially established, a mobile unit typically communicates through a first base station, and the Active Set contains only the first base station. The mobile unit monitors the pilot signal strength of the base stations of the Active Set, the Candidate Set, and the Neighbor Set. When a pilot signal of a base station in the Neighbor Set exceeds a predetermined threshold level, the base station is added to the Candidate Set and removed from the Neighbor Set at the mobile unit. The mobile unit communicates a message to the first base station identifying the new base station. A base station controller decides whether to establish communication between the new base station and the mobile unit. If the base station controller decides to establish communication, then it sends a message to the new base station with identifying information about the mobile unit and a command to establish communications therewith. A message is also transmitted to the mobile unit through the first base station. The message identifies a new Active Set that includes the first and the new base stations. The mobile unit searches for the new base station transmitted information signal, and communication is established with the new base station in soft handoff (without termination of communication through the first base station). This process can continue with additional base stations.

When the mobile unit is communicating through multiple base stations, it continues to monitor the signal strength of the base stations of the Active Set, the Candidate Set, and the Neighbor Set. Should the signal strength corresponding to a base station of the Active Set drop below a predetermined threshold for a predetermined period of time, the mobile unit generates and transmits a message to report the event. The base station controller receives this message through at least one of the base stations with which the mobile unit is communicating. The cellular or personal communication system controller may decide to terminate communications through the base station having a weak pilot signal strength.

While soft handoff generally has been successful on dedicated channels such as traffic channels between a mobile unit and one or more base stations in an Active Set, soft handoff generally has not been available on common channels such as the paging channel, for example. One reason for the absence of soft handoff on a typical paging channel is that soft handoff ordinarily requires sending identical messages from every base station participating in the soft handoff. In prior systems, however, this could result in a considerable reduction in paging channel capacity. For example, let the number of base stations involved in soft handoff on the paging channel be N. Then the paging channel capacity could be reduced by a factor of N. In even a small city, there are tens of cells; and the paging channel capacity could be substantially reduced. Since all base stations in a network cannot be in soft handoff, then there would probably have to be boundaries between groups of cells, and the performance between these groups of cells would be reduced. It is possible to use sets of overlapping groups of cells which are in soft handoff. However, this could mean that many messages would have to be transmitted by multiple sets of these cells, thus resulting in lower paging channel capacity. Unfortunately, since the paging channel generally is not operated in soft handoff, fading and shadowing can cause the forward link of one base station to become stronger than the forward link of another base station.

This can result in significant problems when the mobile unit is attempting to perform system access since it generally cannot as readily perform (hard) handoff in the System Access State. Moreover, calls often are dropped due to delays in getting the mobile unit into soft handoff after the traffic channel is set up.

A similar problem exists when the mobile unit is first assigned to a traffic channel, and the mobile unit initially receives the traffic channel from only one base station. This similar problem was addressed by a technique included in the TIA/EIA-95-B standard, called "Soft-Channel Assignment." Soft Channel Assignment is disclosed in U.S. Pat. No. 6,021,122, issued Feb. 1, 2000, entitled METHOD AND APPARATUS FOR PERFORMING IDLE HANDOFF IN A MULTIPLE ACCESS COMMUNICATION SYSTEM, assigned to the assignee of the present invention and incorporated herein by reference. Soft Channel Assignment reduces the problem of delays in getting a station into soft handoff following traffic channel assignment. During such Soft Channel Assignment, a Channel Assignment Message carries a list of base stations which should be in the mobile station's Active Set. By doing Soft Channel Assignment, the mobile unit is placed into soft handoff as soon as it is assigned to the traffic channel. This significantly increases the speed in which the mobile unit can be placed into soft handoff, thus increasing the reliability of the call set up.

Various techniques have been proposed in the TIA/EIA-95-B specification to reduce the incidence of dropped calls resulting from fading of the paging channel. Two such techniques are called, "Access Probe Handoff" and "Access Handoff". The basic principles are disclosed in U.S. Pat. No. 6,021,122, issued Feb. 1, 2000.

Access Probe Handoff permits a mobile unit to switch to monitoring a new base station between access probes. The mobile unit would switch to monitoring a new base station whenever the forward link of the base station that the mobile unit is monitoring becomes too weak. Thus, for instance, if the mobile unit does not receive an acknowledgement to an access probe, and the mobile unit determines that the paging channel is weak, then the mobile unit may shift to using a new base station. An Extended System Parameters Message sent by the base station to the mobile unit informs the mobile unit of whether it is permitted to perform an Access Probe Handoff and the set of base stations to which the mobile unit is permitted to perform the Access Probe Handoff. In one earlier embodiment, for every base station in the mobile station's neighbor list, the Extended System Parameters Message has a one-bit flag that indicates whether an Access Probe Handoff is permitted to that base station.

Access Handoff permits a mobile unit to switch to monitoring a new base station while awaiting a Channel Assignment Message. Thus, for example, if the mobile unit has received an acknowledgement to its access probe, and the mobile unit determines that the paging channel is weak, then the mobile unit may shift to using a new base station. An Extended System Parameter Message sent by the base station to the mobile unit informs the mobile unit of whether it is permitted to perform an Access Handoff and the set of base stations to which it is permitted to perform the Access Handoff In one earlier embodiment, for every base station in the mobile station's neighbor list, the Extended System Parameters Message has a one-bit flag that indicates whether an Access Handoff is permitted to that base station.

Yet another earlier method specified in TIA/EIA-95-B, referred to as, Access Entry Handoff, permits a mobile unit to begin monitoring a new base station from the time in which the mobile unit receives a page until it transmits a Page Response Message.

Traffic channel handoff generally requires the mobile station to receive an explicit message instructing the mobile unit to perform the handoff. In Access Probe Handoff, Access Handoff, and Access Entry Handoff, the mobile unit does not receive an explicit message instructing it to handoff, but performs a handoff autonomously to a limited set of base stations about which it has informed the base station and about which have been pre-enabled by the base station.

In order to facilitate Soft Channel Assignment, Access Probe Handoff, and Access Handoff, in accordance with the TIA/EIA-95-B specification, the Access Channel Messages sent by a mobile unit identify the set of base stations whose received signal strengths are above a certain threshold level, called T_ADD in TIA/EIA-95-B. The base stations having strengths above T_ADD are those base stations that would be typically placed into the Active Set if the mobile station were on the traffic channel. In TIA/EIA-95-B, the mobile station reports two different lists of base stations in the Access Channel Message. One list is the IDLE_HANDOFF_LIST. This is the set of base stations for which the received signal strengths exceed T_ADD and for which the mobile unit is allowed to perform an Access Probe or Access Handoff. The latter is controlled by one-bit flags in an Extended System Parameters Message corresponding to neighboring base stations. A second set of base stations are those for which the signal strengths exceed T_ADD, and for which Access Probe or Access Handoff is not allowed. The base station can use this information when performing soft channel assignment.

The illustrative drawing of FIG. 1 provides a hypothetical example of the operation of Access Probe Handoff, Access Handoff and Access Entry Handoff.

Nevertheless, there still have been problems with lost calls due to the absence of soft handoff on common channels. For example, there have been problems with lost calls due to loss of the paging channel during call setup. This results in annoyance to customers of the system. Furthermore, the amount of power required to be transmitted on the paging channel is quite large, thus reducing the overall capacity of the system.

Thus, there has been a need for soft handoff on common channels, such as the paging channel, in a cellular system, such as a spread spectrum communication system. The present invention meets this need.

DETAILED DESCRIPTION OF THE PREFERRED EMBODIMENTS

The present invention comprises novel soft handoff on a common communication channel, such as a paging channel, in a cellular communication system. The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein.

Overall System Architecture

Figure 1:
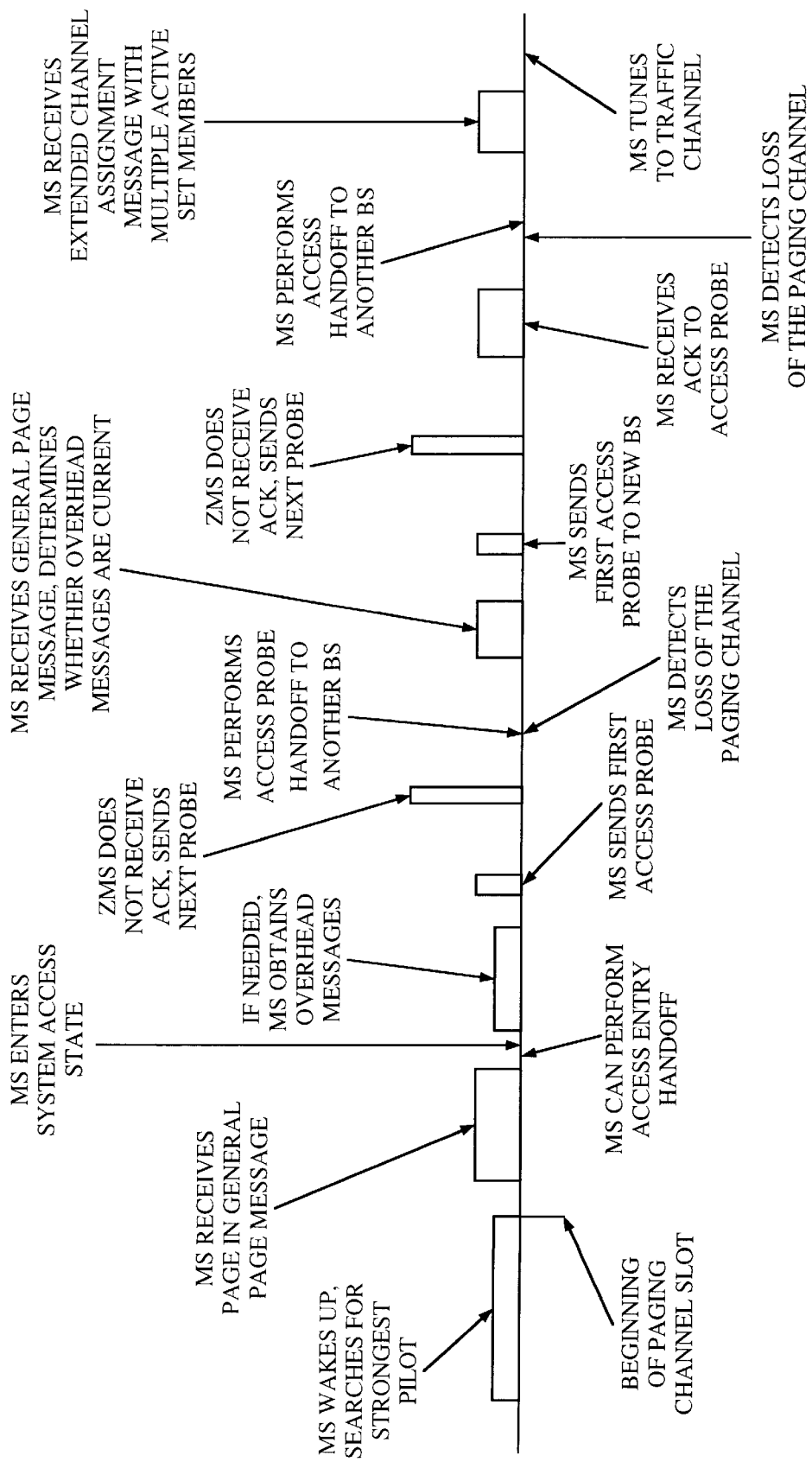
FIG. 1 is an illustration of an exemplary sequence of messaging and monitoring activities involving a mobile unit and one or more base stations when the mobile unit is in a System Access State in accordance with the TIA/EIA-95-B specification.
Figure 2:
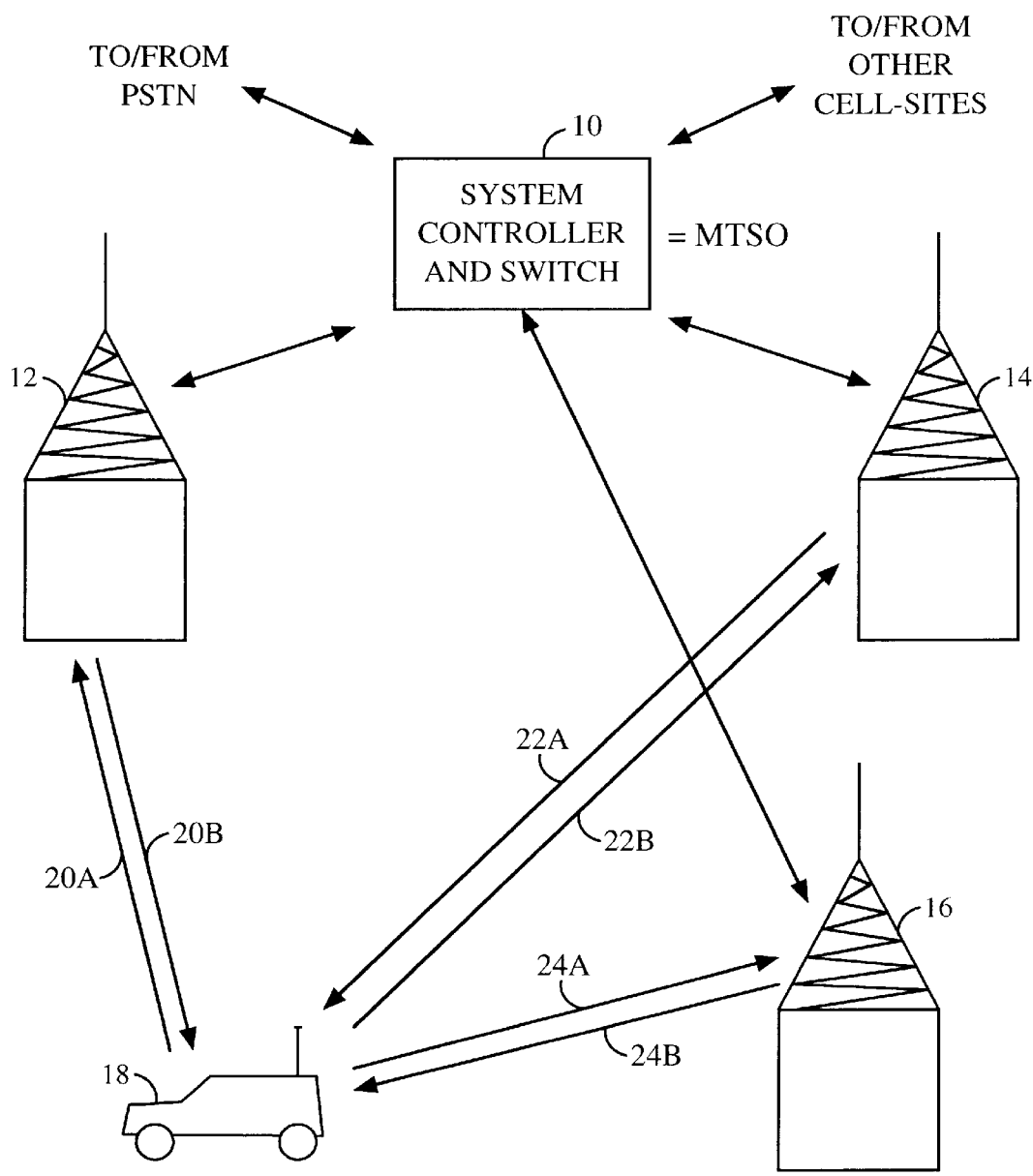
FIG. 2 is a schematic overview of an exemplary CDMA cellular communication system in accordance with a present embodiment of the invention.

A CDMA cellular communication system in accordance with a presently preferred embodiment of the invention is disclosed in U.S. Pat. No. 5,640,414, entitled "MOBILE STATION ASSISTED SOFT HANDOFF IN CDMA CELLULAR COMMUNICATION SYSTEM," which is assigned to the assignee of the present invention and which is hereby incorporated herein by this reference. Referring to the illustrative drawing of FIG. 2, there is shown an exemplary digital cellular communication system. A base station controller 10 may be coupled to the base stations by various means such as dedicated telephone lines, optical fiber links or by microwave communication links. In FIG. 2, three such exemplary base stations, 12, 14 and 16 and an exemplary mobile unit 18 are illustrated. Arrows 20a–20b define possible radio communication links between base station 12 and mobile unit 18. Arrows 22a–22b define possible communication links between base station 14 and mobile unit 18. Similarly, arrows 24a–24b define the possible radio communication links between base station 16 and mobile unit 18. A mobile station may be in the coverage area of a single base station or may be in an area where it can receive signals from multiple base stations as is shown in FIG. 2.

In a presently preferred embodiment of a CDMA cellular communication system, each base station transmits a upon pilot channel a "pilot carrier" signal or, for short, pilot signal. The pilot signal is an unmodulated, direct sequence, spread spectrum signal transmitted at all times by each base station using a common pseudorandom noise (PN) spreading code. The pilot signal allows the mobile units to obtain initial system synchronization, i.e. timing, in addition to providing a phase reference for coherent demodulation and a reference for signal strength for comparisons between base stations for handoff determination.

The pilot signal as transmitted by each base station in the present embodiment is of the same PN spreading code but with a different code phase offset. For example, in a present embodiment of the invention that pilot signal spreading code is of a PN code length of $2^{15}$. In this example there are 511 different offsets from the zero offset, where the offsets are in increments of 64 PN chips. It is this phase offset which allows the pilot signals to be distinguished from one another by the mobile station, resulting in a differentiation between base stations from which they originate. Use of the same pilot signal code allows the mobile station to find system timing synchronization by a single search through all pilot signal code phases. The strongest pilot signal, as identified through a correlation process for each code phase, is readily identifiable. The identified pilot signal generally corresponds to the pilot signal transmitted by the base station with the smallest path delay, which is often, but not always the strongest base station.

Each base station in the present embodiment of the invention also transmits a sync channel signal which is a modulated, encoded, interleaved, direct sequence, spread spectrum signal used by the mobile stations to acquire additional synchronization, system time and, along with these, other overhead control information. Information such as system identification, network identification, a pilot PN sequence offset index, a long code state, current system time along with other time parameters, and paging channel data rate are transmitted on the sync channel. It should be noted that the pilot PN sequence offset index identifies an offset value from a zero offset pilot PN sequence. The sync channel signal is despread using the same pilot PN sequence offset as the pilot channel.

Each base station in the current embodiment also transmits on one or more paging channels corresponding paging channel signals. In a presently preferred embodiment of the invention, the paging channel messages are converted modulated signals for radio transmission. More specifically, in a current embodiment, the paging channel messages are encoded, interleaved, scrambled, modulated, direct sequence, spread spectrum signals. Overhead messages transmitted on the paging channel include a system parameters message, which contains general system and base station overhead information; an access parameters message, which contains information to be used by the mobile unit on an Access Channel when accessing the system; a neighbors list message which identifies to the mobile station the pilot signal PN sequence offset of the neighboring base stations; a CDMA channel list identifying the 1.25 MHz CDMA channels available in this base station, and an Extended System Parameters Message which has information pertaining to access probe handoff and access handoff. Like the sync channel signals, the paging channel signals are spread and despread using the same pilot PN sequence offset as the pilot channel. In the present embodiment, the paging channel is implemented as a slotted multiple channel structure described more fully below.

Each base station transmits user information to an intended mobile unit on selected one of a plurality of traffic channels. Each mobile unit is thus assigned to a unique traffic channel for receiving the mobile unit intended information. In a current embodiment of the invention, the traffic channel signals are modulated, interleaved, scrambled, direct sequence, spread spectrum signals transmitted to mobile units on a respective traffic channel. Information received in the sync channel message is used by the mobile unit to de-scramble the traffic channel scrambled signal.

Further details on the modulation scheme for the various channels of the base station are described in U.S. Pat. No. 5,103,459, entitled "SYSTEM AND METHOD FOR GENERATING SIGNAL WAVEFORMS IN A CDMA CELLULAR TELEPHONE SYSTEM", assigned to the assignee of the present invention, the disclosure thereof incorporated by reference.

A mobile initiated handoff relies on the mobile unit to detect the presence or absence of pilot signals, and the signal strength of the pilot signals. The mobile unit identifies and measures the signal strength of the pilot signals which it receives. This information is communicated via the base station(s) to which the mobile unit is communicating through to the base station controller (BSC). The BSC upon receiving this information initiates or tears down the soft handoffs. To streamline the process of searching for pilots, four distinct sets of pilot offsets are defined: the Active Set, the Candidate Set, the Neighbor Set, and the Remaining Set. The Active Set identifies the base station(s) or sector(s) through which the mobile unit is communicating. The Candidate Set identifies the base station(s) or sector(s) for which the pilots have been received at the mobile unit with sufficient signal strength to make them members of the Active Set, but have not been placed in the Active Set by the base station(s). The Neighbor Set identifies the base station (s) or sector(s) which are likely candidates for the establishment of communication with the mobile unit. The Remaining Set identifies the base station(s) or sector(s) having all other possible pilot offsets in the current system, excluding those pilot offsets currently in the Active, the Candidate and Neighbor sets. Further details on the use of these sets in the handoff scheme are discussed later in further detail.

When a call is set up, a pseudorandom noise (PN) code address is determined for use during the course of this call. Generally, this code address is used to mask the PN long sequence code in a the code unique the code unique to the communication between the base station and the mobile unit. The code address may be either assigned by the base station or preferably be determined by prearrangement based upon the identity of the mobile unit.

After a call is set up, the mobile unit continues to scan the pilot signals transmitted by base stations located in neighboring cells. Pilot signal scanning continues in order to determine if one or more of the neighboring base station transmitted pilot signals rises above a predetermined threshold, a level which is indicative that communications may be supported between the base station and the mobile unit When the pilot signal transmitted by a base station located in a neighboring cell rises above the threshold, it serves as an indication to the mobile station that a handoff should be initiated. In response to this pilot signal strength determination, the mobile unit generates and transmits a control message to the base station presently servicing the call. This control message is relayed on to the base station controller (BSC).

Mobile Unit

Figure 3:
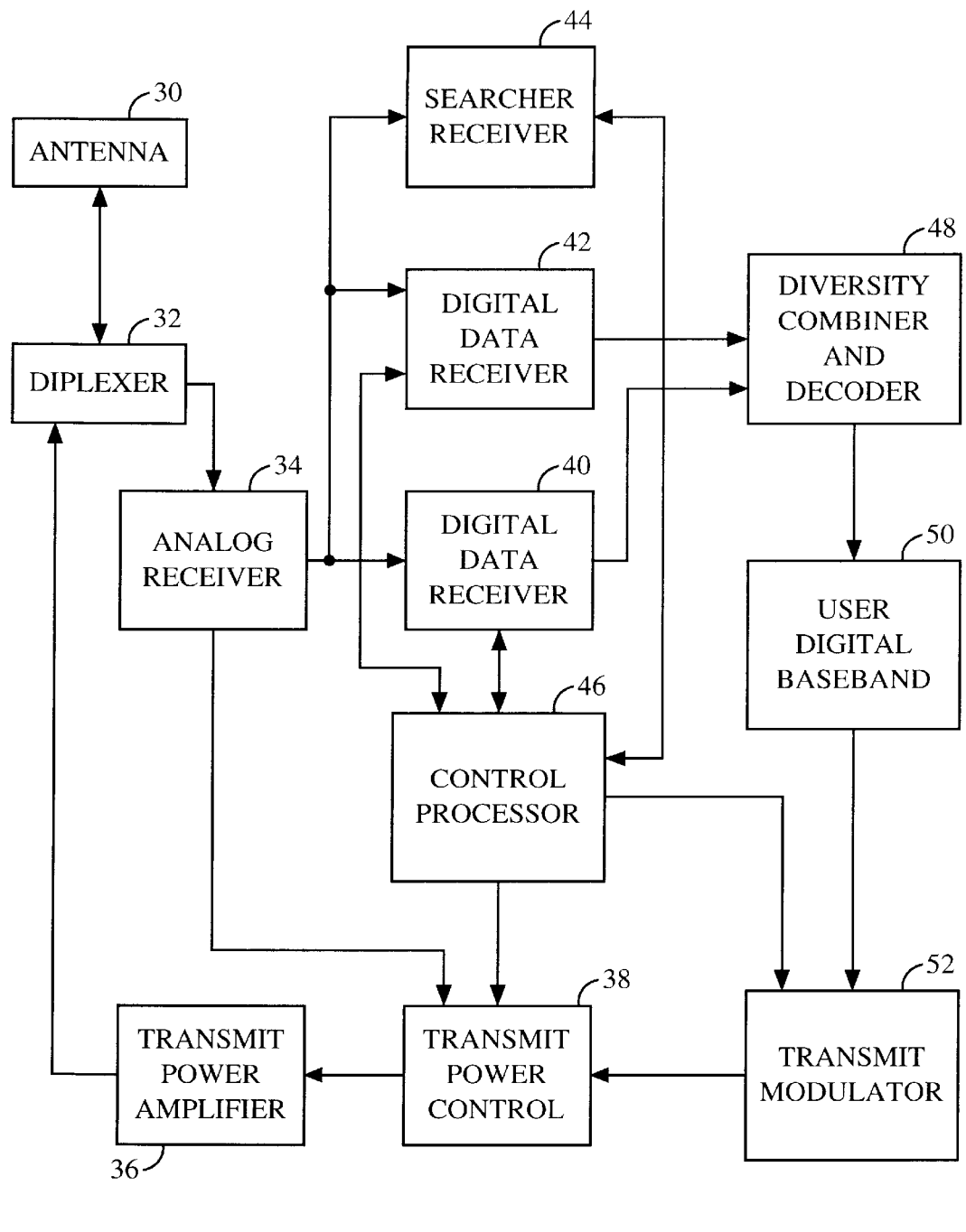
FIG. 3 is a block diagram of a mobile unit in accordance with a present embodiment of the invention, configured for communications in the CDMA cellular system of FIG. 2.

FIG. 3 illustrates in block diagram form an exemplary mobile unit cellular telephone in accordance with a presently preferred embodiment of the invention. The mobile unit includes an antenna 30 which is coupled through diplexer 32 to analog receiver 34 and transmit power amplifier 36. Antenna 30 and diplexer 32 are standard design and permit simultaneous transmission and reception through a single antenna. Antenna 30 collects transmitted signals and provides them through diplexer 32 to analog receiver 34. Receiver 34 receives the RF frequency signals from diplexer 32 which in the current embodiment are typically in the 850 MHz frequency band for U.S. cellular, the 1.9 GHz frequency band for U.S. PCS. Then the signals are amplified and down converted to an IF frequency. This frequency translation process is accomplished using a frequency synthesizer of standard design which permits the receiver to be tuned to any of the frequencies within the receive frequency band of the overall cellular telephone frequency band.

The IF signal is then passed through a surface acoustic wave (SAW) bandpass filter which in the preferred embodiment is approximately 1.25 MHz in bandwidth. The characteristics of the SAW filter are chosen to match the waveform of the signal transmitted by the bas station which has been direct sequence spread spectrum modulated by a PN sequence clocked at a predetermined rate, which in the preferred embodiment is 1.2288 MHz.

Receiver 34 also performs a power control function for adjusting the transmit power of the mobile station. Receiver 34 generates an analog power control signal that is provided to transmit power control circuitry 38. The control and operation of the mobile station power control feature is disclosed in U.S. Pat. No. 5,056,109 entitled "METHOD AND APPARATUS FOR CONTROLLING TRANSMISSION POWER IN A CDMA CELLULAR MOBILE TELEPHONE SYSTEM," assigned to the assignee of the present invention, to which the disclosure is also incorporated by reference.

Receiver 34 is also provided with an analog to digital (A/D) converter (not shown) for converting the IF signal to a digital signal. The digitized signal is provided to each of three or more signal processors or data receivers, one of which is a searcher receiver with the remainder being data receivers. For purposes of illustration only one searcher receiver and two data receivers are shown in FIG. 3.

In FIG. 3, the digitized signal output from receiver 34 is provided to digital data receivers 40 and 42 and to searcher receiver 44. It should be understood that an inexpensive, low performance mobile station might have only a single data receiver while higher performance stations may have two or more, preferably a minimum of three, to allow diversity reception.

The digitized IF signal may contain the signals of many on-going calls together with the pilot carriers transmitted by the current and all neighboring base stations. The function of the receivers 40 and 42 is to correlate the IF samples with the proper PN sequence. This correlation process provides a property that is well-known in the art as "processing gain" which enhances the signal-to-interference ratio of a signal matching the proper PN sequence while not enhancing other signals. The correlation output is then coherently detected using the pilot carrier offset PN sequence used for the correlation as a carrier phase reference. The result of this detection process is a sequence of encoded data symbols.

A property of the PN sequence as used in the present invention is that discrimination is provided against multipath signals. When the signal arrives at the mobile receiver after passing through more than one path, there will be a difference in the reception time of the signal. This reception time difference corresponds to the difference in distance divided by the speed of light. If this time difference exceeds one PN chip, 0.8138 microseconds, in the preferred embodiment, then the correlation process will discriminate against one of the paths. The receiver can choose whether to track and receive the earlier or later path. If two receivers are provided, such as receivers 40 and 42, then two independent paths can be tracked simultaneously.

Searcher receiver 44, under control of control processor 46 is for continuously scanning the time domain, around the nominal time of a received pilot signal of the base station, for other multi-path pilot signals from the same base station and for other base station transmitted pilot signals. Receiver 44 will measure the strength of any reception of a desired waveform at times other than the nominal time. Receiver 44 uses the ratio of the received pilot energy per chip to total received spectral density, noise and signals, denoted as $E_c I_o$ as a measure of the pilot signal strength. Receiver 44 provides a signal strength measurement signal to control processor 46 indicative of the pilot signal and its signal strength.

Processor 46 provides signals to data receivers 40 and 42 for each to process a different one of the strongest signals. Receivers 40 and 42 may process a multipath signal from a single base station or signals from two different base stations.

The outputs of receivers 40 and 42 are provided to diversity combiner and decoder circuitry 48. The diversity combiner circuitry contained within circuitry 48 adjusts the timing of the two streams of received signals into alignment and adds them together. This addition process may be preceded by multiplying the two streams by a number corresponding to the relative signal strengths of the two streams. This operation can be considered a maximal ratio diversity combiner. The resulting combined signal stream is then decoded using a forward stream error detection decoder also contained within circuitry 48.

In the exemplary embodiment convolutional encoding is utilized. The optimum decoder for this type of code is of the soft decision Viterbi algorithm decoder design. The resulting decoded information bits are passed to the user digital baseband circuitry 50.

Baseband circuitry 50 typically includes a digital vocoder (not shown). Baseband circuitry 50 further serves as an interface with a handset or any other type of peripheral device. Baseband circuitry 50 accommodates a variety of different vocoder designs. Baseband circuitry 50 provides output information signals to the user in accordance with the information provided thereto from circuitry 48. It should be understood that various other types of service, other than voice, may also be offered to which the disclosure herein is equally applicable.

User analog voice signals typically provided through a handset are provided as an input to baseband circuitry 50. Baseband circuitry 50 includes an analog to digital (A/D) converter (not shown) which converts the analog signal to digital form. The digital signal is provided to the digital vocoder where it is encoded. The vocoder output is provided to a forward error correction encoding circuit (not shown) for error correction. This voice digitized encoded signal is output from baseband circuitry 50 to transmit modulator 52.

During transmission of call traffic after a traffic channel has been set up, transmit modulator 52 modulates the encoded signal on a PN carrier signal whose PN sequence is chosen according to the assigned address function for the call. The PN sequence is determined by control processor 46 from call setup information that is transmitted by the base station and decided receivers 40 and 42. In the alternative, control processor 46 may determine the PN sequence through prearrangement with the base station. Control processor 46 provides the PN sequence information to transmit modulator 52 and to receivers 40 and 42 for call decoding. Transmit modulator 52 also modulates the data with a common unshifted version of the PN code that is used by the base station.

The output of transmit modulator 52 is provided to transmit power control circuitry 38. Signal transmission power is controlled by the analog power control signal provided from receiver 34. Furthermore, control bits are transmitted by the base stations in the form power adjustment command and are processed by data receivers 40 and 42. The power adjustment command is used by the control processor in setting the power level in mobile station transmission. In response to the power adjustment commands, control processor 46 generates a digital power control signal that is provided to circuitry 38.

Transmit power control circuitry 38 outputs the power controlled modulated signal to transmit power amplifier circuitry 36. Circuitry 36 amplifies and converts the IF signal to an RF frequency by mixing with a frequency synthesizer output signal which tunes the signal to the proper output frequency. Circuitry 36 includes an amplifier which amplifies the power to a final output level. The intended transmission signal is output from circuitry 36 to diplexer 32. Diplexer 32 couples the signal to antenna 30 for transmission to the base stations.

Control processor 46 is also capable of generating control messages such as cell-diversity mode requests and base station communication termination commands. These commands are provided to transmit modulator 52 for transmission. Control processor 46 is responsive to the data received from data receivers 40, 42 and search receiver 44 for making decisions relative to handoff and diversity combining.

Base Station

Figure 4:
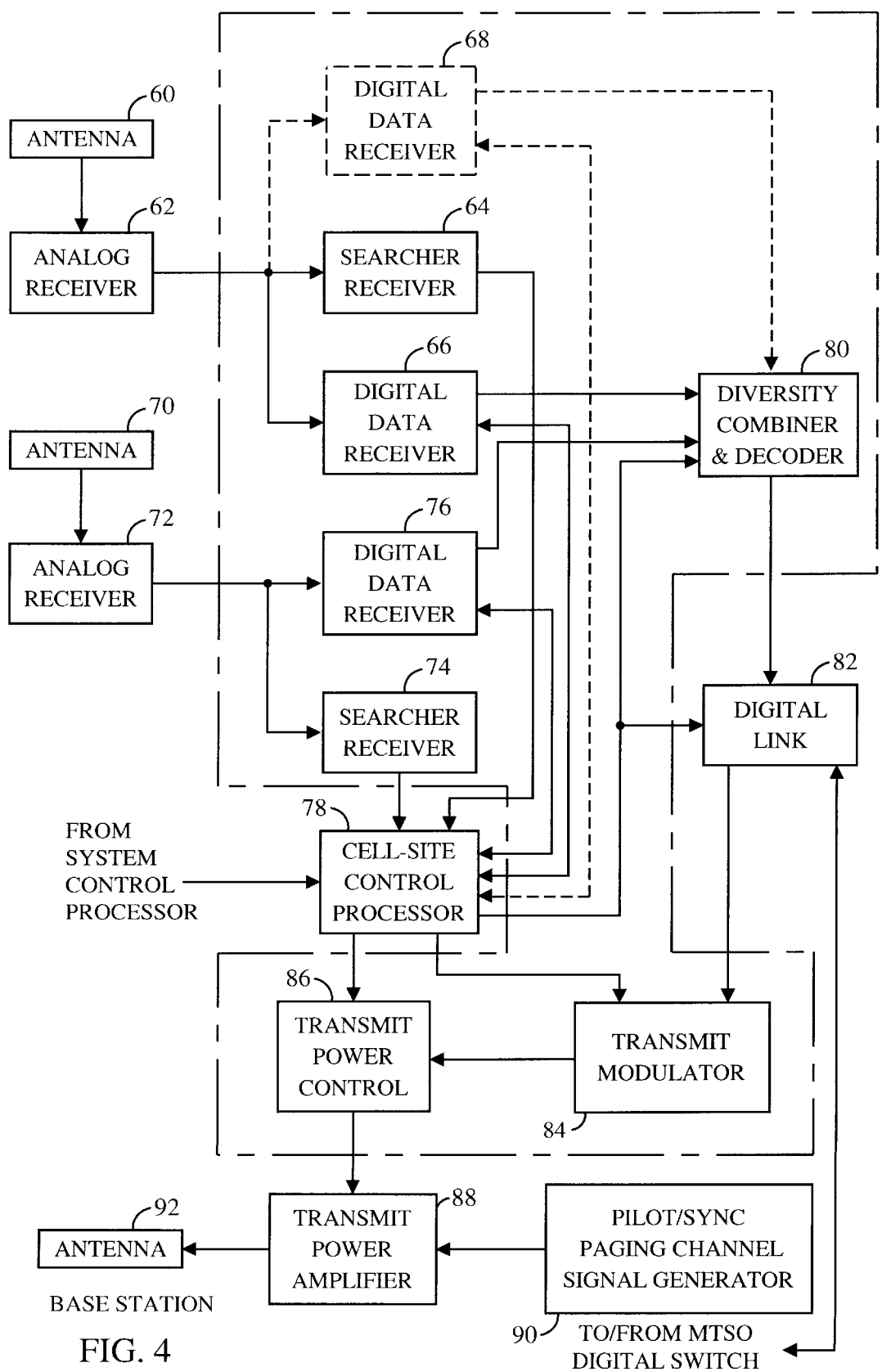
FIG. 4 is a block diagram of a base station in accordance with a presently preferred embodiment of the invention, configured for communication in the CDMA cellular system of FIG. 2.

FIG. 4 illustrates in block diagram form an exemplary embodiment of the base station equipment in accordance with a presently preferred embodiment of the invention. At the base station, two receiver systems are utilized with each having a separate antenna and analog receiver for space diversity reception. In each of the receiver systems the signals are processed identically until the signals undergo a diversity combination process. The elements within the dashed lines correspond to elements corresponding to the communications between the base station and one mobile station. The output of the analog receivers are also provided to other elements used in communications with other mobile stations.

In FIG. 4, the first receiver system is comprised of antenna 60, analog receiver 62, searcher receiver 64 and digital data receiver 66. This receiver system may also include an optional digital data receiver 68. Although only one optional digital data receiver 68 is illustrated it should be understood that several additional ones may be used. The second receiver system includes antenna 70, analog receiver 72, searcher receiver 74 and digital data receiver 76. Again additional optional digital data receivers (not shown) may be utilized for this receiver system. Also utilized in signal processing and control for handoff and diversity is base station control processor 78. Both receiver systems are coupled to diversity combiner and decoder circuitry 80. Digital link 82 is utilized to communicate signals to and from the base station controller (FIG. 5) with base station transmit modulator 84 and circuitry 80 under the control of control processor 78.

Signals received on antenna 60 are provided to analog receiver 62. Received signals amplified by an amplifier in receiver 62 are translated to an IF frequency by mixing with a frequency synthesizer output signal. The IF signals are bandpass filtered and digitized in a process identical to that described with reference to the mobile station analog receiver. The digitized IF signals are provided to digital data receiver 66, optional data receiver 68 and searcher receiver 64 and are processed respectively in a manner similar to that as disclosed with reference to the digital data receivers and searcher receiver of the mobile station in FIG. 3. However, the processing by the digital data receivers and searcher receivers are different for the mobile to base station link from that used in the base unit to mobile link in several respects.

In the inbound, or mobile unit to base station link, the mobile unit does not transmit a pilot signal that can be used for coherent reference purposes in signal processing at the base station. Thus, in a present embodiment, the mobile unit to base station link utilizes a non-coherent modulation and demodulation scheme using 64-ary orthogonal signaling.

Searcher receiver 64 is again used to scan the time domain about the receiver signal to ensure that the associated digital data receiver 66, and data receiver 68 if used, are tracking and processing the strongest available time domain signals. This tracking process is identical to that described with reference to the mobile station. Searcher receiver 64 provides a signal to base station control processor 78 which provides control signals to digital data receivers 66 and 68 for selecting the appropriate received signals for processing.

The digital data receiver 66 (and 68) produces estimates of the received signals and provides weighting of the received data signals. The weighting function is linked to a measured signal strength. The weighted data is then provided as an output to diversity combiner and decoder circuitry 80.

The second receiver system processes the received signals in a manner similar to that discussed with respect to the first receiver system of FIG. 4. The outputs from receivers 66 and 76 are provided to diversity combiner and decoder circuitry 80. Circuitry 80 includes adding and other weighting circuitry that combines the symbols from digital data receiver 66 with the weighted symbols from receiver 76. The result is used to determine a set of decoder weights and symbols for use within a Viterbi algorithm decoder implemented in circuitry 80.

The Viterbi decoder is utilized to determine the most likely information bit sequence. For each vocoder data block, nominally 20 msec. of data, a signal quality estimate is obtained and transmitted as a mobile station power adjustment command along with data to the mobile station. The quality estimate is the average signal-to-noise ration over the 20 msec interval.

In FIG. 4, optional digital data receiver 68 may be included for improved performance of the system. This additional data receiver alone or in combination with additional receivers can track and receive other possible delay paths of mobile station transmitted signals. The structure and operation in this receiver is similar to that described with reference to the digital data receivers 66 and 76. Receiver 68 is utilized to obtain additional diversity modes.

Signals from the BSC are coupled to the appropriate transmit modulator via digital link 82 under the control of control processor 78. Transmit modulator 84 spread spectrum modulates, according to a predetermined spreading function (PN code) as assigned by control processor 78, the data for transmission to the intended recipient mobile station. The output of transmit modulator 84 is provided to transmit power control circuitry 86 where under the control of control processor 78, the transmission power may be controlled. The output of circuitry 86 is provided to transmit power amplifier circuitry 88.

In the preferred implementation, each of a traffic channel (user data communication channel), sync channel, one or more paging channels, and pilot channel are modulated by a different Walsh function sequence. Although only the traffic channels are modulated with each unique PN code, each traffic channel along with the other channels are modulated by a common PN sequence. In the exemplary implementation the pilot channel Walsh function sequence is the "all zero" sequence thus resulting the pilot signal being the common PN sequence itself. All signals as modulated by the common PN sequence are provided to transmit power amplifier circuitry 88.

Circuitry 88 includes a summer for summing the output of transmit modulator 84 with the output of other transmit modulators at the base station. Circuitry 88 further includes a summer for summing the pilot signal/sync channel signal/paging channel signal output from generator 90 with the summed transmit modulator output signals. Circuitry 88 also includes a digital to analog converter, frequency upconversion circuitry and an amplifier for respectively converting the digital signals to analogs signals, converting the IF frequency signals as output from the transmit modulators to an RF frequency and amplifying the RF signal. The output from circuitry 88 is provided to antenna 92 where it is radiated to mobile units within the base station service area.

Base station control processor 78 has the responsibility for assignment of digital data receivers and modulators to a particular call. Control processor 78 also monitors the progress of the call, quality of the signals and initiates teardown on loss of signal. The base station communicates with the BSC via link 82 where it is coupled by a standard telephone wire, optical fiber, or microwave link.

Base Station Controller

Figure 5:
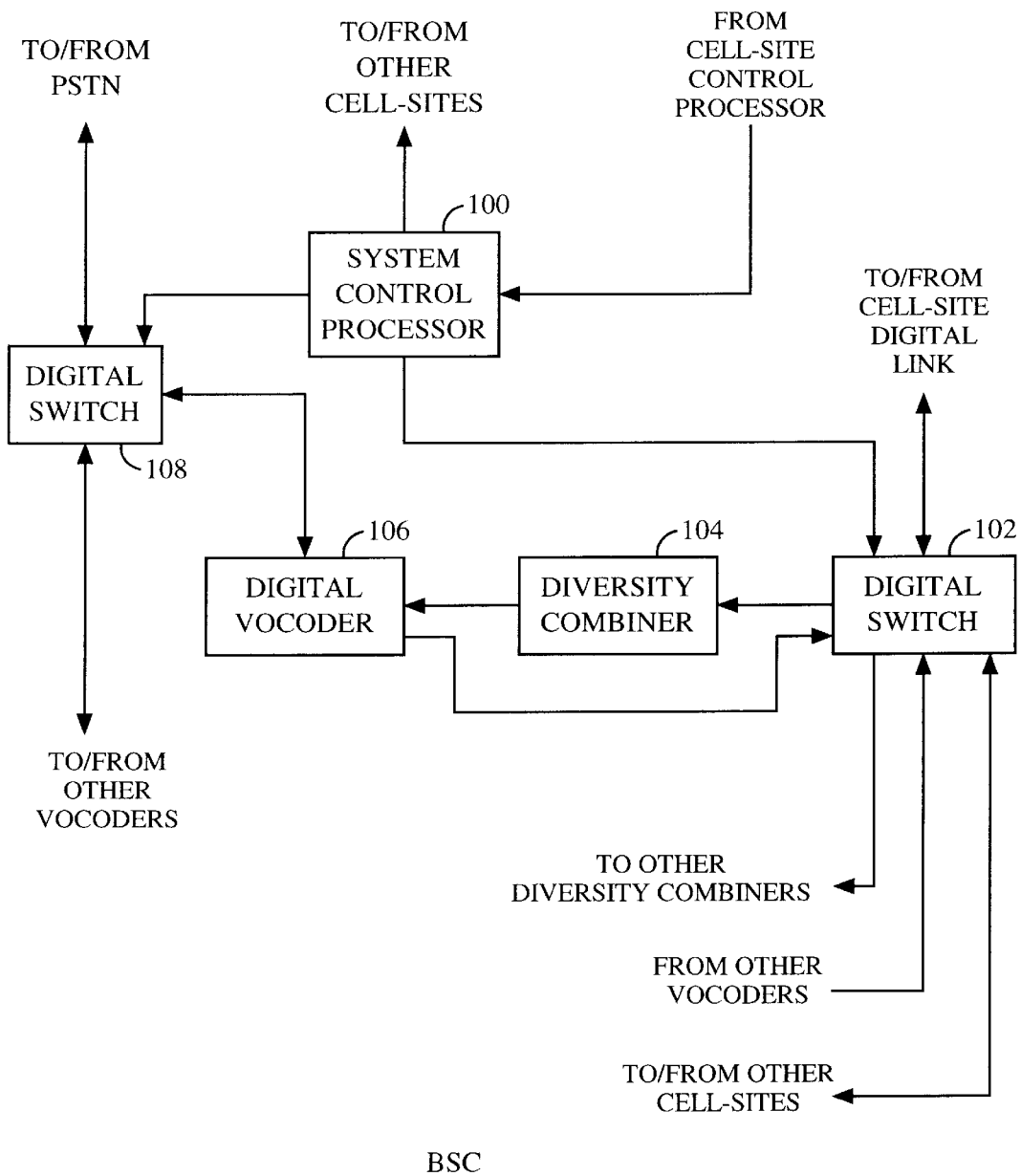
FIG. 5 is a block diagram of a base station controller in accordance with a present embodiment of the invention, configured for communications in the CDMA cellular system of FIG. 2.

FIG. 5 illustrates in block diagram form the equipment utilized in the BSC of a presently preferred embodiment of the invention. The BSC typically includes a system controller or system control processor 100, digital switch 102, diversity combiner 104, digital vocoder 106 and digital switch 108. In a present embodiment, the switch 102 is a pocket switch. Although not illustrated, additional diversity combiners and digital vocoders are coupled between digital switches 102 and 108.

When the cell-diversity mode is active, or the BSC is in the handoff process with the call processed by two or more base stations, signals will arrive at the BSC from more than one base station with nominally the same information. However, because of fading and interference on the inbound link from the mobile station to the base stations, the signal from one base station may be of better quality than the signal from the other base station.

Digital switch 102 is used in routing the information stream corresponding to a given mobile station from one or more base stations to diversity combiner 104 or the corresponding diversity combiner as determined by a signal from system control processor 100. When the system is not in the cell-diversity mode, diversity combiner 104 may be either bypassed or fed the same information on each input port.

A multiplicity of serial coupled diversity combiners (or selectors) and vocoders are provided in parallel, nominally, one for each call to be processed. Diversity combiner 104 compares the signal quality indicators accompanying the information bits from the two or more base station signals. Diversity combiner 104 selects the bits corresponding to the highest quality base stations signal on a frame-by-frame basis of the information for output to vocoder 106.

In a present embodiment, Vocoder 106 converts the format the digitized voice signal to standard 64 Kbps PCN telephone format, analog, or any other standard format. The resultant signals are transmitted from vocoder 106 to digital switch 108. Under the control of system control processor 100, the call routed to the PSTN.

Voice signals coming from the PSTN intended for a mobile unit are provided to digital switch 108 to an appropriate digital vocoder such as vocoder 106 under control of system control processor 100. Vocoder 106 encodes the input digitized voice signals and provides the resulting information bit stream directly to digital switch 102. Digital switch 102 under system control processor control directs the encoded data to the base station or base stations to which the mobile unit is communicating. If the mobile unit is in a handoff mode communicating to multiple base stations or in a cell diversity mode, digital switch 102 routes the calls to the appropriate base stations for transmission by the appropriate base station transmitter to the intended recipient mobile station. However, if the mobile unit is communicating with only a single base station or not in a cell diversity mode, the signal is directed only to a single base station.

System control processor 100 provides control over digital switches 102 and 108 for routing data to and from the BSC. System control processor 100 also determines the assignment of calls to the base stations and to the vocoders at the BSC. Furthermore, system control processor 100 communicates with each base station control processor about the assignment of particular calls between the BSC and base station, and the assignment PN codes for calls. It should be further understood that as illustrated in FIG. 5 digital switches 102 and 108 are shown as two separate switches, however, this function may be performed by a single physical switching station.

It should also be understood the embodiment provided herein with respect to the system architecture is merely and exemplary embodiment of the system and that other system architecture may be employed. For example, as described herein the system controller is located at the BSC for control of many of the base station functions and handoff function. In an equally preferred mode, many of the functions of the system controller may be distributed throughout the base station.

Overview of System Operation During Common Channel Soft Handoff

In operation, the searcher receiver 44 constantly monitors received pilot signals to determine which pilot signals exceed a prescribed threshold value referred to as T_ADD in the present embodiment. The control processor 46 creates PMI messages which identify the base stations for which the searcher has measured pilot signal levels above the threshold. The PMI message can be sent alone or it can be attached to other messages. These are the base stations that are proposed by the mobile unit to participate in common channel soft handoff. Alternatively, the base station could measure a different value such as the total received power from different base stations to determine which base stations to communicate with. The control processor also identifies the mobile unit sending the message, and it can identify the time slot in which it will monitor the common channel, the F QPCH and F-CCCH in the present embodiment. In the current embodiment, however, the time slot need not be sent by the mobile unit since it is ascertained based upon mobile unit identity (e.g. IMSI) as described below. In a presently preferred embodiment, a long code is used on the F-CCCH to identify the mobile unit to which a message is directed. A long code is a maximal length sequence, and the phase of the long code can be used to identify individual mobile units, though other units could be used to identify the mobile unit. The use of a long code on the F-CCCH can obviate the need to use addresses on the F-CCCH to identify mobile units. The control processor 46 also causes the diversity combiner and decoder 48 to monitor those base stations that have been reported in the most recent PMI message to have signal levels above the threshold and that also have been identified by one of the base stations that are permitted to participate in common channel soft handoff. In the current embodiment, the mobile unit ordinarily receives soft handoff permission information from the base station that is the closest or has the strongest pilot signal. The permission information indicates which base stations are eligible for common channel soft handoff. The permission information is provided in a Handoff Table which is described in detail below.

It will be appreciated that the mobile unit can continually monitor the pilot signal strengths of multiple base stations. It can send new updated PMI messages whenever there is a change in the set of pilot signals that exceed the threshold. Moreover, the mobile unit can continually alter the set of base stations monitored for common channel soft handoff. As a result, the set of base stations monitored by the mobile unit is continually updated to account for changes in pilot signal strengths, and as described below, the BSC and the base stations are notified of these updates so that the common channel soft handoff messages can be tailored to the needs of the mobile unit.

The base station that receives the mobile unit PMI message communicates the message to the BSC. The BSC reads the PMI information. If a Call Origination or a Call Termination is initiated with the base station, for example, the system control processor 100 assembles an appropriate message, such as an Acknowledge Message or a Page Message or a Channel Assignment Message, for instance. The BSC uses the permission information in the Handoff Table to determine which base stations are eligible to participate in soft handoff. The BSC causes some set of these base stations to transmit the appropriate messages to the mobile unit within the appropriate time slot. The set of base stations designated by BSC to transmit to the mobile unit in common channel soft handoff may depend upon the base stations identified by the mobile unit in the PMI information. A specific example of Call Origination is provided below with reference to FIG. 9. Specific examples of Call Termination are provide below with reference to FIGS. 10–16.

Multiple Common Channel Structure

A common channel is a communication channel that is continually shared. For example, messages on a common channel may be directed from a base station to a first mobile unit in a first time interval, and may be directed to a second mobile unit during a second time interval immediately following the first and may be directed to a third mobile unit during a third time interval immediately following the second.

A paging channel is a forward common communication channel used by a base station to communicate to a mobile unit when the mobile unit is not assigned to a traffic channel. A CDMA spread spectrum communication system of a presently preferred embodiment of the invention has multiple common channels. In the current embodiment, multiple slotted common channels are employed in order to reduce mobile unit power consumption since a mobile unit need only be active for prescribed time intervals.

Slotted channels deliver messages during prescribed time intervals or slots. An advantage of the use of slotted mode is that a mobile unit may conserve power by monitoring such channels only during the prescribed time slots. Slotted mode also has been referred to as "sleep mode" since the mobile unit can power-down and sleep when idle and wake up to monitor the slot.

A Forward Broadcast Channel (F-BCCH) paging channel broadcasts overhead information, such as system parameters messages, and broadcast short messages. Broadcast short messages are a class of short messages that are directed to a large number of mobile stations. The overhead messages sent on the F-BCCH generally will involve information that will be different for different base stations. A Forward Common Control Channel (F-CCCH) channel carries messages directed to particular mobile units such as channel assignment messages. The F-CCCH can also carry broadcast short messages. A Forward Quick Paging Channel (F-QPCH) carries indications of pages directed to a mobile station. The base station transmits a signal to a given mobile station on the F-QPCH whenever it needs to contact a mobile unit operating in slotted mode.

F-CCCH

In a current embodiment of the invention, the F-CCCH is transmitted intermittently. As a result, a preferable arrangement is for it to be variable rate/on-off. In this arrangement, the channel is transmitted for a frame if there is a message to send. As a result, capacity is not wasted in transmitting this channel when there is no message to send. Furthermore, the channel can be transmitted during a frame at one of several different rates, with the rate being chosen based upon the ability of the base station to supply the amount of power needed to send data at the particular rate to the mobile station.

F-BCCH

The F-BCCH is a separate logical channel conveying overhead information. The F-BCCH is not transmitted in a soft handoff mode since much of the information conveyed is specific to a sector. A mobile unit may continue to monitor these F-BCCH messages even after it has established a traffic channel. The mobile unit may monitor the F-BCCH when it is monitoring the F-CCCH in order to receive broadcast short messages and in order to update its overhead information. The mobile unit may also monitor the F-BCCH when it needs to update overhead information and it is receiving the F-QPCH. The overhead information might include RAND (pseudorandom number patterns used for authentication), channel code parameters and Neighbor Sets, just to mention a few possible examples.

Figure 6:
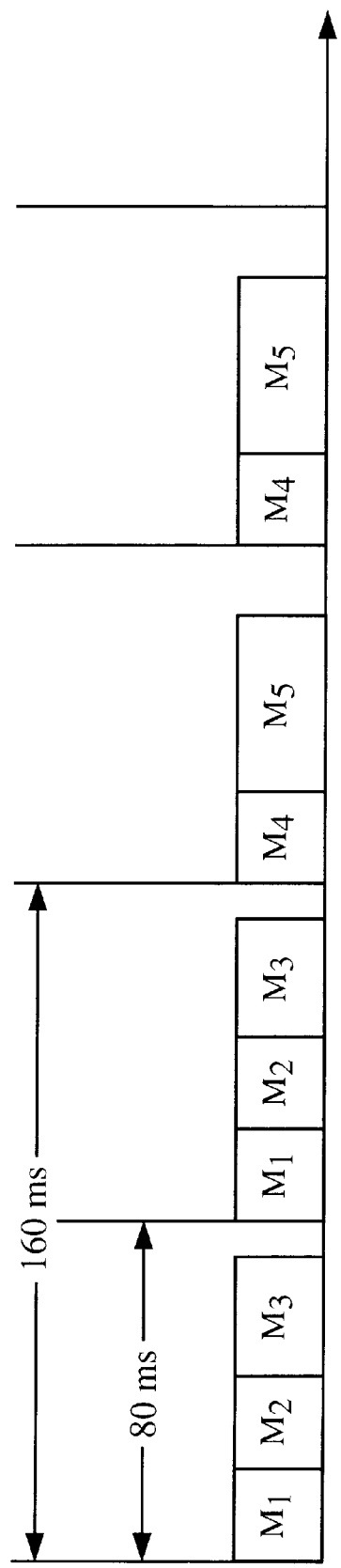
FIG. 6 is an illustrative message sequence diagram showing the re-transmission of paging messages on the F-BCCH in accordance with a present embodiment of the invention.

The F-BCCH also can be operated in an intermittent mode similar to the F-CCCH. However, the F-BCCH generally conveys only a relatively few overhead messages that do not change frequently. Ordinarily, only mobile units that are first powering on or that are handing off to the sector need to receive these overhead messages. Thus, it is usually desired that the F-BCCH be transmitted with as little amount of power as is necessary. In order to achieve more efficient lower power operation, F-BCCH overhead messages are transmitted and then repeated. An illustrative example of repeating F-BCCH messages is shown in FIG. 6. More specifically, the F-BCCH messages are repeated at known intervals in a way that the transmitted symbols are exactly the same.

Figure 7:
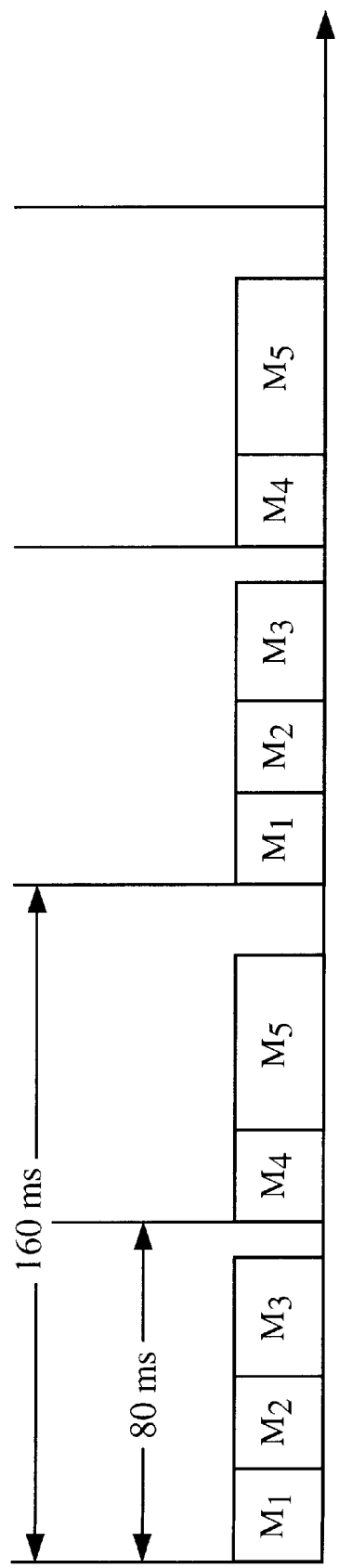
FIG. 7 is an illustrative message sequence diagram showing the interleaving of re-transmitted paging messages on the F-BCCH in accordance with an alternative embodiment of the invention.

In the example in FIG. 6, the messages are repeated during 80 ms intervals. It should be noted that this time interval could be any value which is known by the mobile unit (or told to the mobile unit). Furthermore, as shown in FIG. 7, message transmissions can be interleaved with prior message transmissions. The main requirement being that messages are repeated at some interval known to the mobile unit so that it can perform diversity combining.

In a present embodiment of the invention, messages on the F-CCCH are directed to individual mobile units. A mobile unit monitors the F-QPCH slot to determine whether or not paging messages are to be sent to the mobile unit on the F-CCCH. More specifically, a mobile unit monitors page notification information in its prescribed time slot of the F-QPCH in order to determine whether or not there is a paging message directed to it. The page notification information monitored in the F-QPCH time slot is very short so that the mobile station does not have to expend significant power determining whether or not there exists an actual message directed to it. If the page notification information indicates that there is no paging message directed to the mobile unit, then the mobile unit can go back to a sleep mode until the next prescribed F-QPCH time slot. If the page notification information indicates that there is a paging message directed to the mobile unit, then the mobile unit monitors the F-CCCH for a predetermined time interval in an attempt to receive a Page Message. described below with reference to FIG. 10. Alternatively, the mobile unit could immediately respond on the R-CCCH with a Quick Page Response Message described below with reference to FIG. 11. The mobile unit then waits for the page message which can be transmitted in soft handoff. Another alternative embodiment is to have the mobile unit respond with a Quick Page Response Message and then wait for the Channel Assignment Message—that is, the Page Message is not transmitted.

F-QPCH

The F-QPCH carries page notification information. Each mobile unit is assigned a time slot in the F-QPCH. The F-QPCH time slots assigned to any given mobile unit are prescribed by the identity of the mobile unit. There are numerous ways in which a mobile unit can be identified, such as ESN, IMSI or TMSI to name a few. Thus, a given mobile unit can be assigned the same F-QPCH time slots for each of multiple different base stations. That is, the F-QPCH time slots are assigned independently of base station identity.

A presently preferred embodiment of the invention implements a hashed-On-Off Keying (OOK) Forward Quick Paging Channel (F-QPCH) in which an on-off keyed (OOK) symbol is used to notify a mobile station that it must listen to the F-CCCH during the next F-CCCH paging channel slot. The mobile is identified by the position of the OOK symbol in the F-QPCH slot.

More specifically, in a current embodiment the quick paging channel contains single bit messages to direct slotted-mode mobile stations to monitor their assigned slot on the paging channel. In a presently preferred embodiment, the data rate is fixed at 9,600 bps, and the modulation is on-off keying (OOK), where a logical "1" instructs the mobile station to monitor the F-CCCH, and a logical "0" instructs the mobile station to return to sleep. In the current embodiment, one OOK bit is transmitted in each 128 PN chip, symbol period. The transmit Ec/Ior while sending a 1 bit should be three decibels below the Pilot Channel Ec/Ior when soft handoff is not used. Each single bit message is transmitted twice per 80 millisecond slot, once in bit $R_1$, then again in bit $R_2$, where a logical "1" indicates the first bit, which starts at the 80 ms timing boundary.

In a present embodiment, the set of possible bit positions over which the quick paging channel is defined starts 80 ms before the interval on the F-CCCH. This starting point can be defined as time t, where t is in units of frames, such that $$\left\langle \left\lfloor \frac{t-4}{4} \right\rfloor - PGSLOT \right\rangle_{16T} = 0,$$

where $T=2^i$ is the slot cycle length in units of 1.28 seconds, and i is the slot cycle index, and PGSLOT stands for page slot.

The mobile station hashes to one or two bit positions per slot. The second bit is transmitted for increased reliability of the decision. Each hashing randomizes each bit over 340 non-overlapping bit positions. The decorrelation values are defined so that they update each 1.28 seconds (64 frames), in order to prevent repeat collisions between mobile stations. The decorrelation cycle repeats every 23.3 hours.

$$DECORR_1 = \left\langle \left\lfloor \frac{t-4}{64} \right\rfloor \right\rangle_{2^{16}},$$

$$DECORR_2 = \left\langle \left\lfloor \frac{t-4}{64} \right\rfloor + 1 \right\rangle_{2^{16}},$$

L is bits 0–15 of HASH_KEY (MIN or IMSI_S),
H is bits 16–31 of HASH_KEY (MIN or IMSI_S), $$R_1 = \frac{1}{RATE}\left\lfloor RATE \cdot N \cdot \frac{\langle 40503 \cdot (L \oplus H \oplus DECORR_1)\rangle_{2^{16}}}{2^{16}} \right\rfloor$$

and $$R_2 = \frac{1}{RATE}\left\lfloor RATE \cdot N \cdot \frac{\langle 40503 \cdot (L \oplus H \oplus DECORR_2)\rangle_{2^{16}}}{2^{16}} \right\rfloor + N,$$

where
N=340,
L is bits 0–15 of HASH_KEY (MIN or IMSI_S),
H is bits 16–31 of HASH_KEY (MIN or IMSI_S), $$DECORR_1 = \left\langle \left\lfloor \frac{t-4}{64} \right\rfloor \right\rangle_{2^{16}} \text{ and}$$

$$DECORR_2 = \left\langle \left\lfloor \frac{t-4}{64} \right\rfloor + 1 \right\rangle_{2^{16}}.$$

Figure 8:
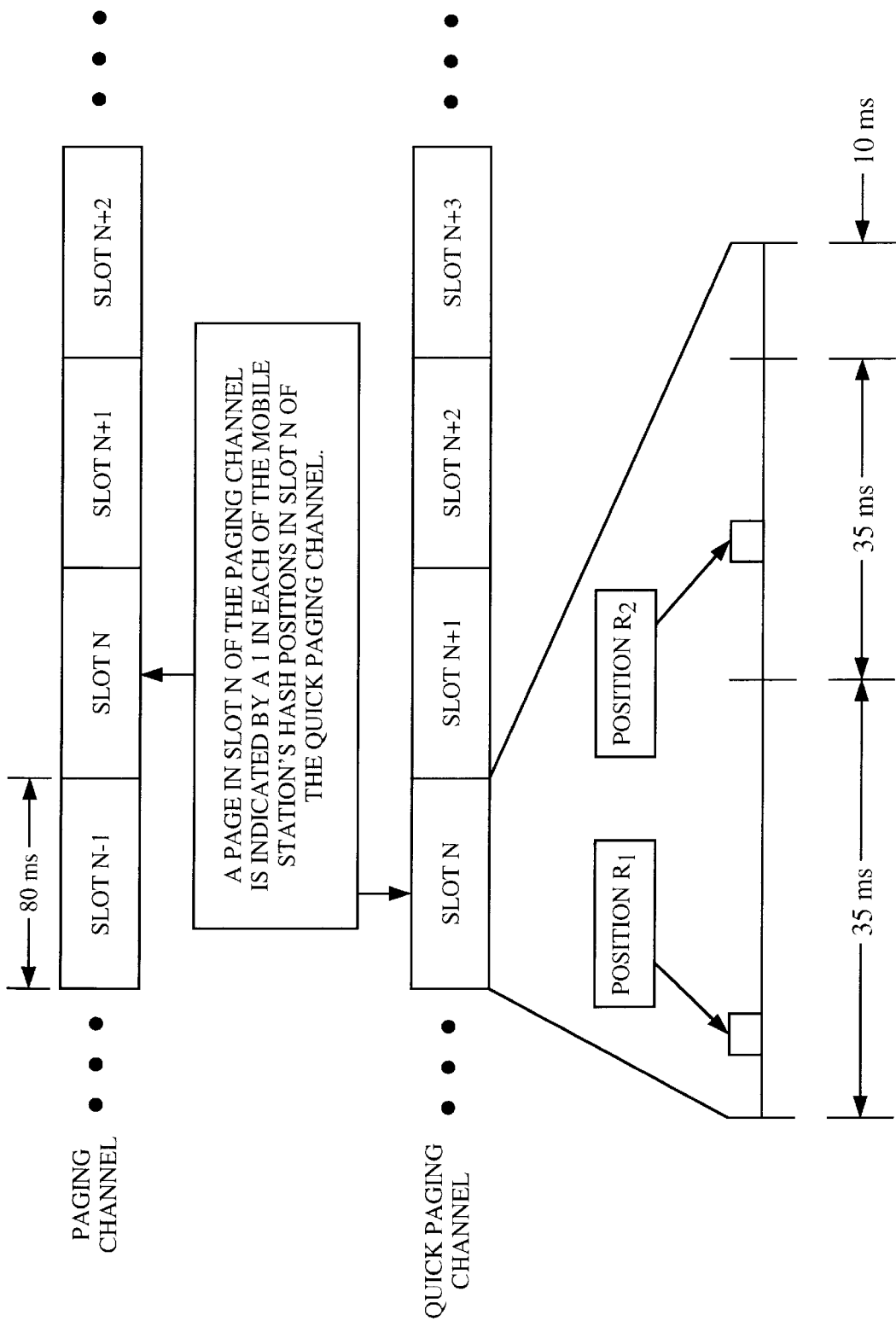
FIG. 8 is an illustrative F-QPCH and F-CCCH paging channel timing diagram in accordance with a present embodiment of the invention.

Referring to the illustrative F-QPCH and F-CCCH timing diagram of FIG. 8, the possible locations for F-QPCH messages in a present embodiment of the invention are located from 80 milliseconds to 9.17 milliseconds before the F-CCCH slot for that mobile station is to begin. This leaves at least 9.17 milliseconds from the second transmission on the quick paging channel for the mobile station to prepare for receiving the F-CCCH. The quick paging channel is not to be scrambled by a long PN code.

Thus, the base station simply sends a logical "1" in the correct bit positions in a time period defined above ranging from 9.17 milliseconds to 80 milliseconds before the slot of the paging channel to alert slotted-mode mobile stations that it is sending a paging message in the immediately following F-CCCH time slot. The base station is to perform the hashes to bit positions defined above, based on mobile unit identity and system time, and set those bits to logical "1". All other bits are to be set to logical "0".

A mobile unit in accordance with the current embodiment employs a 16 by 16 multiplier and bit-wise exclusive-or to implement the hashing function which is updated prior to each slot. The mobile unit may go back to sleep after monitoring a bit. A false alarm in the first bit requires the mobile to monitor the second bit position. False alarms in both bits require the mobile to monitor the F-CCCH.

An alternative embodiment of the invention implements a short packet to notify a mobile unit that it must listen to messages in the next F-CCCH time slot. The mobile unit is identified by a key in the packet. More specifically, in this alternative embodiment the quick paging channel carries between one and twelve quick paging channel packets per paging channel slot. The format of the quick paging channel packet is shown in the following Paging Channel Packet.

| Field | Length (bits) | Description |
| --- | --- | --- |
| TYPE | 2 | The packet type. Possible frame types are<br>00 - No mobile stations need to wake up, and this is the last packet in this slot.<br>01 - All mobiles stations need to wake up, and this is the last packet in this slot.<br>10 - All mobile stations that hash to value HASH need to wake up, and this is the last packet in this slot. |

-continued

| Field | Length (bits) | Description |
| --- | --- | --- |
|  |  | 11 - All mobile stations that hash to value HASH need to wake up, and there is at least one more packet in this slot. |
| HASH | 10 | The hash value. |
| CRC | 12 | The CRC. |

In this alternative embodiment, each packet is 24 bits. Each packet is transmitted in two power control groups (2.5 milliseconds). Therefore, the packet is transmitted at 9600 bps. As a result, during transmission, the quick paging channel requires approximately the same power as the paging channel.

If an incorrectly decoded packet goes undetected, then the mobile unit may decide not to listen to the paging channel when it should listen to the paging channel. Therefore, the undetected error probability should be sufficiently below the desired minimum call failure probability. In this alternative embodiment, using only a 12 bit CRC, the probability of undetected error is 1/4096. Since this is 40 times less than an acceptable call failure rate, it is sufficiently small. Using the measured Es/Nt or re-encoder symbol error rate, the probability of undetected error may be reduced further.

The value of HASH is dependent on the mobile unit identification (MSID) and system time in frames (t).
$N=2^{10}$,
$DECORR=\lfloor t/64 \rfloor \bmod 2^{16}$,
L=bits 0–15 of HASH_KEY (MIN or IMSI_S),
H=bits 16–31 of HASH_KEY (MIN or IMSI_S), and
$HASH=\lfloor N\times((40503\times(L\oplus H\oplus DECORR)) \bmod 2^{16})/2^{16} \rfloor$.

The quick paging channel packet contains only one HASH value.

Therefore, the overhead associated with TYPE and CRC fields can be relatively high. This overhead can be reduced by including more HASH values in each packet.

Each quick paging channel packet is encoded using the convolutional encoder used on traffic channel. In a current implementation a constraint length 9, rate ¼ convolutional encoder is employed. The initial encoder state is "0". The above quick paging channel packet does not have any tail bits. Because the packet is relatively short, the penalty for tail bits can be relatively high.

Quick paging channel packets for page messages in paging slot N are sent in quick paging channel slot N−1.

In this alternative embodiment, the start of the first packet is randomized. This is done in order to randomize the chance the quick paging channel packets sent from adjacent base stations will be sent at the same time. In the present embodiment, the start of the first packet is aligned to the start of a power control group which occupies a 1.25 ms interval on the Forward Traffic Channel. The power control group is dependent on the base station identification (BASE_ID) and the system time in frames (t).
N=32,
$DECORR=\lfloor t/64 \rfloor \bmod 2^{16}$,
L=BASE_ID,
H=0, and
$POSITION=\lfloor N\times((40503\times(L\oplus H\oplus DECORR)) \bmod 2^{16})/2^{16} \rfloor$.

This randomizes the start of the first packet over the first 40 milliseconds of the 80 millisecond slot. Therefore, since packets are 2.5 milliseconds long, there can be up to 16 packets per slot.

QPCH and F-CCCH Soft Handoff

In soft handoff, identical information, carried in identically converted, modulated signals is transmitted from multiple base stations so that the multiple identical transmissions can be combined by a single mobile unit through diversity reception.

In common channel soft handoff in accordance with the present invention, identical QPCH and F-CCCH messages are carried in identically converted, modulated signals and are transmitted by multiple base stations so that they can be combined by a single mobile unit through diversity reception.

In operation, each individual base station sends F-QPCH and F-CCCH channel soft handoff permission information on its respective F-BCCH paging channel that indicates which other base stations are permitted to participate in soft handoff on the on the F-QPCH and F-CCCH. More specifically, each individual base station may send messages on its respective F-BCCH paging channel that identify other base stations that are permitted to transmit, together with such individual base station, to a given mobile unit in soft handoff on an F-CCCH. Similarly, each individual base station may send messages on its respective F-BCCH paging channel that identify other base stations that are permitted to transmit, together with such individual base station, to a given mobile unit in soft handoff on a F-QPCH. In a presently preferred embodiment of the invention, separate single bit flags may be individually set or reset for each of several other base stations to indicate which of those other base stations may communicate in soft handoff with the given mobile unit on the F-CCCH and F-QPCH paging channels. Separate sets of flags could be used for the F-CCCH and the F-QPCH. Alternatively, one single bit flag could be set for each of several other base stations to indicate which of those other base stations may communicate in soft handoff with the given mobile unit on the F-CCCH and F-QPCH paging channels.

It will be appreciated that the availability of paging channel soft handoff in accordance with the present invention does not preclude the use of Access Handoff or Access Probe Handoff or Access Probe Handoff. Therefore, in a current embodiment, each individual base station may also send hard handoff permission information on its respective F-BCCH paging channel that indicates which other base stations are permitted to participate in (hard) Access Handoffs.

The exemplary Handoff Table set forth below illustrates the handoff permission flags sent by sector "A" of base station "A" in its F-BCCH overhead messages. These handoff permission flags identify other base stations in the Neighbor List of base station "A" for which Access Handoff is allowed, for which F-CCCH soft handoff is allowed and for which F-QPCH soft handoff is allowed. In this example, there are four other base stations in the Neighbor List of base station A. They are base stations B, C, D and E. In the Handoff Table, there is an individual flag for every other base station sector for which Access Handoff is permitted. There is also an individual flag for every other base station sector for which F-CCCH soft handoff is permitted. Finally, there is a flag for every other base station sector for which F-QPCH soft handoff is permitted. In this example, a flag set to "1" indicates that handoff is permitted, and a flag set to "0" indicates that handoff is not permitted.

HANDOFF TABLE

| Base Station | IS-95-B ACCESS_HO_ALLOWED Flag | F_CCCH_SOFT_HANDOFF Flag | FQPCH_SOFT_HANDOFF Flag | Comments |
|---|---|---|---|---|
| A2 | 1 | 1 | 1 | Access handoff, F-CCCH soft handoff; F-QPCH soft handoff |
| A3 | 1 | 1 | 1 | Access handoff, F-CCCH soft handoff; F-QPCH soft handoff |
| B1 | 1 | 1 | 1 | Access handoff, F-CCCH soft handoff; F-QPCH soft handoff |
| B2 | 1 | 1 | 1 | Access handoff, F-CCCH soft handoff; F-QPCH soft handoff |
| B3 | 1 | 1 | 1 | Access handoff, F-CCCH soft handoff; F-QPCH soft handoff |
| C1 | 1 | 0 | 1 | Access handoff, F-QPCH soft handoff |
| C2 | 1 | 0 | 1 | Access handoff, F-QPCH soft handoff |
| C3 | 1 | 0 | 1 | Access handoff, F-QPCH soft handoff |
| D1 | 1 | 0 | 0 | Access handoff |
| D2 | 1 | 0 | 0 | Access handoff |
| D3 | 1 | 0 | 0 | Access handoff |
| E1 | 0 | 0 | 0 | |
| E2 | 0 | 0 | 0 | |
| E3 | 0 | 0 | 0 | |

In this example, a mobile unit in the cell area covered by sector A1 is permitted to perform F-CCCH soft handoff with any other sector of base station A and with all three sectors of base station B. However, a mobile unit in the cell area covered by sector A1 is not permitted to perform F-CCCH soft handoff with any of base stations C, D or E. Also, in this example, a mobile unit in the sector A1 cell area may perform F-QPCH soft handoff with any other sector of base stations A and with any of the sectors of base stations B or C, but it may not perform F-QPCH soft handoff with either of base stations D or E. Finally, a mobile unit in sector A1 may perform an Access Handoff with sectors A2 and A3 of base station A and with any of the sectors of B, C and D, but it may not perform an Access Handoff with any sector of base station E.

Thus, the base station covering a cell area in which a mobile unit is located sends an F-BCCH message which indicates to the mobile unit other base stations with which the mobile unit is permitted to perform F-CCCH soft handoff, QPCH soft handoff or Access Handoff. This handoff permission information may be used by the base station to accomplish handoffs before a traffic channel has been established. For example, the F-CCCH soft handoff permission information can be used during call setup, in the course of a call origination message sequence or in the course of a call termination message sequence as described more fully below. Moreover, the Access Handoff permission information informs the mobile unit of which base stations are available for a hard handoff in case the F-CCCH is lost before a traffic channel is set up.

A determination of the which base stations in a given base station's Neighbor List are to perform F-QCPH or F-CCCH soft handoff may be fixed or it may be changed dynamically under control of a base station controller. For example, a base station controller may be programmed to monitor the volume of call originations or terminations in different base station cell areas, and to send individual messages, determined by the volume of calls in different cells, to individual base stations which alter the sets of other base stations that may perform F-QCPH or F-CCCH soft handoff with such individual base stations. It will also be noted that, for the above Handoff Table, some base stations are permitted to participate only in F-QPCH soft handoff; others are permitted to participate in both F-QCPH and F-CCCH soft handoffs; and others are not permitted to participate in either F-QPCH or F-CCCH soft handoffs. In the present embodiment of the invention, it is possible that a larger number of base stations will be permitted to participate in F-QPCH soft handoff than in F-CCCH soft handoff. One reason for this is that F-QCPH paging channel messages usually are short, only one or two bits, and F-CCCH paging channel messages typically are significantly longer. As a result, fewer base stations may be allowed to participate in F-CCCH soft handoff than in F-QPCH soft handoff, since it is often much easier for a base station controller to coordinate short message length F-QCPH soft handoffs than to coordinate longer message length F-CCCH soft handoffs.

The determination of which base stations in a given base station's Neighbor List are to perform paging channel soft handoff also may depend upon the specific layout and organization of the overall cellular system. For instance, in the above example, base station D is not permitted to participate in F-QPCH soft handoff. This might be because base station D is in a different registration zone than the other base stations, for example. Neither F-QCPH soft handoff nor F-CCCH soft handoff nor Access handoff is permitted for base station E. This might be because base station E is controlled by another BSC, for example. Moreover, in some circumstances it might be desirable to restrict paging channel soft handoff on the F-CCCH to only sectors of the same base station in order to synchronize and control the soft handoff from a single base station cell. Under such circumstances in the above example, F-CCCH soft handoff would only involve sectors A2 and A3 in addition to A1.

F-CCCH Soft Handoff During Call Origination Example

Figure 9:
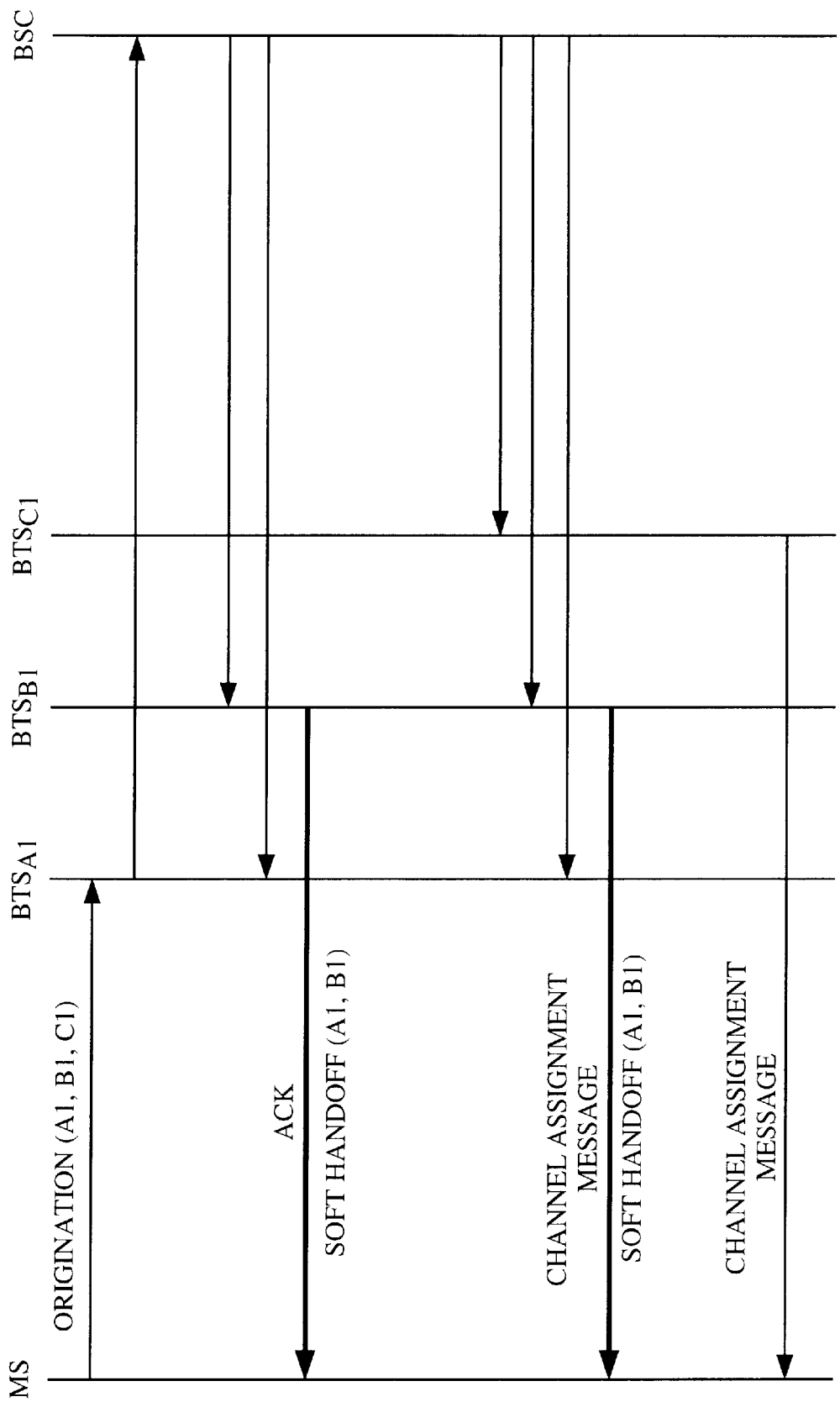
FIG. 9 is an illustrative message sequence diagram showing a call origination message sequence transmitted in paging channel soft handoff between a mobile unit, multiple base stations and a base station controller in accordance with a present embodiment of the invention.

Referring to the illustrative drawings of FIG. 9, there is provided a timing diagram showing a call origination message sequence between a mobile unit, multiple base stations and a base station controller during the origination of a call by the mobile station. During a call origination, a mobile unit sends an Origination Message to the base station with the strongest pilot signal to indicate that a call is to be originated by the mobile unit, and the base station and the base station controller should coordinate the process of assigning a traffic channel to the mobile unit. In the example illustrated in FIG. 9, assume that the mobile unit is located in sector A1 of base station A when it issues the Origination Message. In a present embodiment of the invention, the mobile unit sends the pilot measurement information, previously described in every message on the Access Channel. Assume that the pilot signals of base station sectors B1 and C1 are above a prescribed pilot signal strength level. Then the mobile unit sends to base station A1 an indication that the pilot signal strengths of B1 and C1 exceed the threshold. In the preferred embodiment, this indication is the pilot PN phase of base stations B1 and C1, though any indicator of these base stations can be used. Furthermore, it is preferred that the mobile unit sends the strength of base stations B1 and C1 as well as the strength of base station A1 which the mobile station is directly monitoring. Note that the mobile unit previously received the exemplary Handoff Table via overhead messages on the F-BCCH, which for instance may have been transmitted from base station A1 to the mobile unit upon entry into the coverage area of base station A1 as a result of powering up, entering from a neighboring base station or switching from another frequency. The Handoff Table indicates that F-CCCH soft handoff is permitted with B1, and that Access Handoff is permitted with C1.

The Origination Message is received by base station "A" which sends the message to its base station controller. An Acknowledgement Message is generated at the BSC and is transmitted from the BSC to base stations A1 and B11.

The base stations with a pilot signal strength above a prescribed threshold, as measured by the mobile unit, and that have F-CCCH-SOFT-HANDOFF set to "1" in the Handoff Table are B1. These two base stations, therefore, transmit the Acknowledgement Message to the mobile station in soft handoff.

If Access Probe Handoff were enabled in base station C1, then the base station controller would send the acknowledgement to base station C1. Base station C1 could send the message to the mobile unit in a soft handoff mode or not; since the mobile unit has not been told that base station C1 is operating in soft handoff mode, the mobile station will not combine base station C1 in soft handoff mode. In order to avoid having to determine the set of base stations in which to actually send the message, the BSC may send the Acknowledgement Message to a larger set of base stations. These base stations may directly transmit the message or they may have their own filters and determine that a certain message does not need to be transmitted in the particular base station. Once a base station receives the Acknowledgement Message, and determines that it is to be sent, it sends it on the F-CCCH. It should be noted that those base stations that are in soft handoff must send the Acknowledgement Message in a soft handoff way which entails synchronizing the transmissions of the messages from the two base stations and transmitting the message at exactly the same time as is done with the IS-95-A traffic channel, for instance. It should be noted that once the mobile unit sends the Origination Message, the mobile unit continuously monitors the F-CCCH for awhile. If the mobile unit has not received the Acknowledgement Message within some short time interval, it retransmits the Origination Message. This is similar to what is done in IS-95-A, for example.

Meanwhile, the BSC sets up a traffic channel for use by the mobile unit and then sends a Channel Assignment Message (or information used to determine the Channel Assignment Message) to base stations A, B and C. The BSC sends the Channel Assignment Message to base station B since B1 was reported (in the pilot measurement information in the Origination Message to have a pilot signal strength above a prescribed threshold as measured by the mobile unit, and F-CCCH-SOFT-HANDOFF was set to "1". The base station controller sends the Channel Assignment Message to base station C since C1 was also reported in the pilot measurement information in the Origination Message to have a pilot signal strength above a prescribed threshold as measured by the mobile unit, and F_ACCESS_HO WAS SET TO "1". The Channel Assignment Message is transmitted on the F-CCCH in soft handoff mode from base stations A1 and B1. Consistent with TIA/EIA-95-B, the Channel Assignment Message is also transmitted by base station C1. The transmission from base station C1 is not in soft handoff since the mobile unit is not combining the C1 transmission with the A1 and B1 transmissions.

F-QPCH Soft Handoff During Call Termination Example

Figure 10:
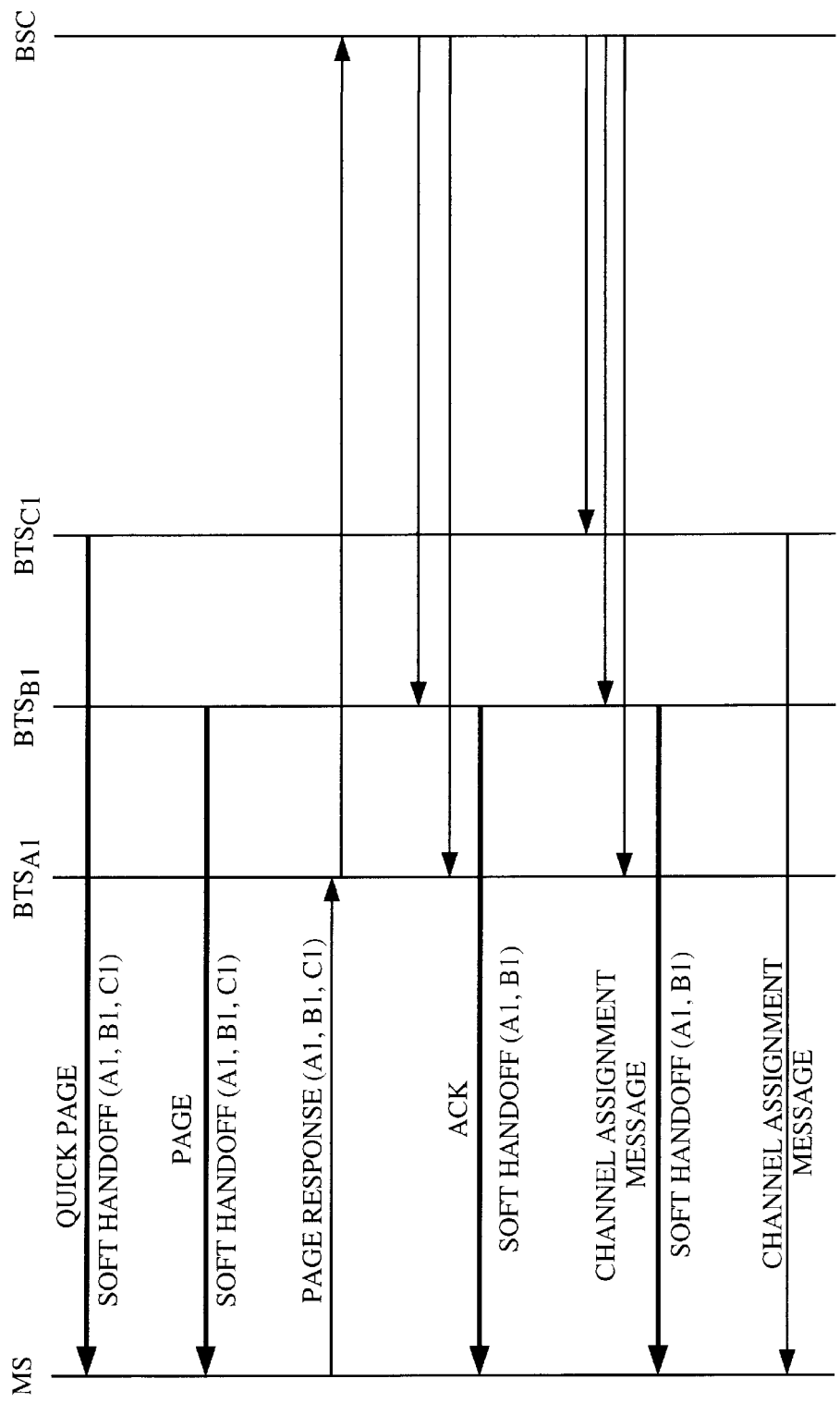
FIG. 10 is an illustrative message sequence diagram showing a call termination message sequence transmitted in paging channel soft handoff between a mobile station, multiple base stations and a base station controller in accordance with a present embodiment of the invention.

Referring to the illustrative drawings of FIG. 10, there is provided a timing diagram showing an exemplary call termination message sequence between a mobile unit, multiple base stations and a base station controller. During the call termination sequence, the BSC and multiple base stations coordinate the assignment of a traffic channel for communication between the mobile unit and one or more base stations. More specifically, in the example of FIG. 10, while the mobile unit is located in sector A1 of the cell region of base station A, base station sectors A1, B1 and C1 send identical F-QPCH messages at a particular time that may be determined by the International Mobile Subscriber Station Identity (IMSI) of the mobile unit and the configuration of the base station. It will be appreciated that the mobile unit may transmit its IMSI to a base station during call registration, for example. Also, as explained above, the BSC is aware of the configuration of the base stations within the overall system. Generally, base stations in a given paging region are configured so that they all transmit a F-QPCH at substantially the same time. In accordance with the invention, F-QPCHs of those base stations that transmit their quick pages at substantially the same time can be combined by a mobile station in a soft handoff. The mobile unit receives the Handoff Table from base station A1 via overhead messages on the F-BCCH.

Referring to the exemplary Handoff Table transmitted to the mobile unit by the base station A, it will be seen that the F-QPCH-SOFT-HANDOFF flag is logical "1" for base station sectors A1, A2, B1, B2, B3, C1, C2, and C3 since these base station sectors are in the same paging area or are otherwise able to send a quick page at the same time. Base station A1 has set the F-QPCH-SOFT-HANDOFF flag to logical "0" for base station D since this base station is not in the same paging area or is otherwise unable to send a quick page at the same time as the other base stations.

In the example illustrated in FIG. 10, the mobile unit receives the quick page (F-QPCH) in soft handoff from base station sectors A1, B1 and C1. The mobile unit monitors the F-QPCH slot during its designated time slot as described above. When the mobile unit receives the F-QPCH messages from A1, B1 and C1, it combines them in a soft handoff mode. Then, as described above, mobile unit determines whether or not a quick page message has been directed to it. Once the mobile unit determines that it did in fact receive a quick page set to logical "1" during its designated time slot, the mobile unit begins to monitor its prescribed time slot in the F-CCCH. Next, the base station controller instructs base stations to send a Page Message with the full address of the mobile unit such as its IMSI, TMSI or electronic serial number (ESN). In additional to the identity of the mobile station, the Page Message contains other information such as the proposed service option.

There are a number of alternative approaches to sending the Page Message. In the preferred embodiment certain base stations send this message out using soft handoff just as with the F-QPCH. In an alternative approach, a different set of base stations could be used to send the Page Message in soft handoff. This different set of base stations could be specified by flags in an additional column of the Handoff Table Another alternative is to not use soft handoff at all for the Page Message.

Moreover, in the presently preferred embodiment, the set of base stations that are transmitting the Page Message could actually be smaller than the set indicated by the FQPCH_SOFT_HANDOFF Flags if the BSC has some additional information on the mobile unit's location, such as a recent communication with the mobile unit. This would permit the BSC to determine a smaller set of base stations to transmit the message than would otherwise be used. Returning to the preferred method, the mobile unit combines the Page Message of A1, B1, and C1 in soft handoff since the mobile unit is in sector A1 and the F-QPCH-SOFT-HANDOFF flag is set to logical "1" for B1 in the Handoff Table, and the B1 pilot signal is above a prescribed threshold. The mobile station responds to the soft handoff Page Message by sending a Page Response Message to base station A1 since it has the strongest pilot signal. The Page Response Message lists the pilot measurement information for neighboring base stations. In this example shown in FIG. 10, base stations A1, B1, and C1 are above the threshold and are reported.

The process from this point is essentially identical to the Call Origination process previously described. Base station A1 communicates the Page Response Message to the base station controller. Next, the base station controller instructs base stations A1 and B1 to send another Acknowledgement Message to the mobile station on their F-CCCHs in soft handoff. Another Acknowledgement Message also is sent to the mobile unit by C1 on its F-CCCH, but this C1 Acknowledgement Message is not sent in soft handoff. Finally, the base station controller sets up a traffic channel for use by the mobile station, and then sends a Channel Assignment Message (or information used to determine the Channel Assignment Message) to base stations A, B and C. The base station controller sends the Channel Assignment Message to base station B because the mobile unit measured the B1 pilot signal strength to be above the prescribed threshold value, and because F-CCCH-SOFT-HANDOFF was set to "1" for B1. The base station controller sends the Channel Assignment Message to base station C since the mobile station measured the C1 pilot signal to be above the prescribed threshold value and because F_ACCESS_HO was set to "1" for C1. The Channel Assignment Message is transmitted in soft handoff from base stations A1 and B1. Consistent with TIA/EIA-95-B, the Channel Assignment Message is also transmitted from base station C1. The transmission from base station C1 is not in soft handoff since the mobile station is not combining the C1 transmission with the A1 and B1 transmissions.

Alternatively, the Page Message can be eliminated, and the mobile station can instead respond directly to the Quick Page Message with a Page Response Message. However, the false alarm rate on the quick paging channel may be sufficiently high that so that it is preferable for the mobile station to wait for the Page Message before sending a Page Response Message.

Figure 11:
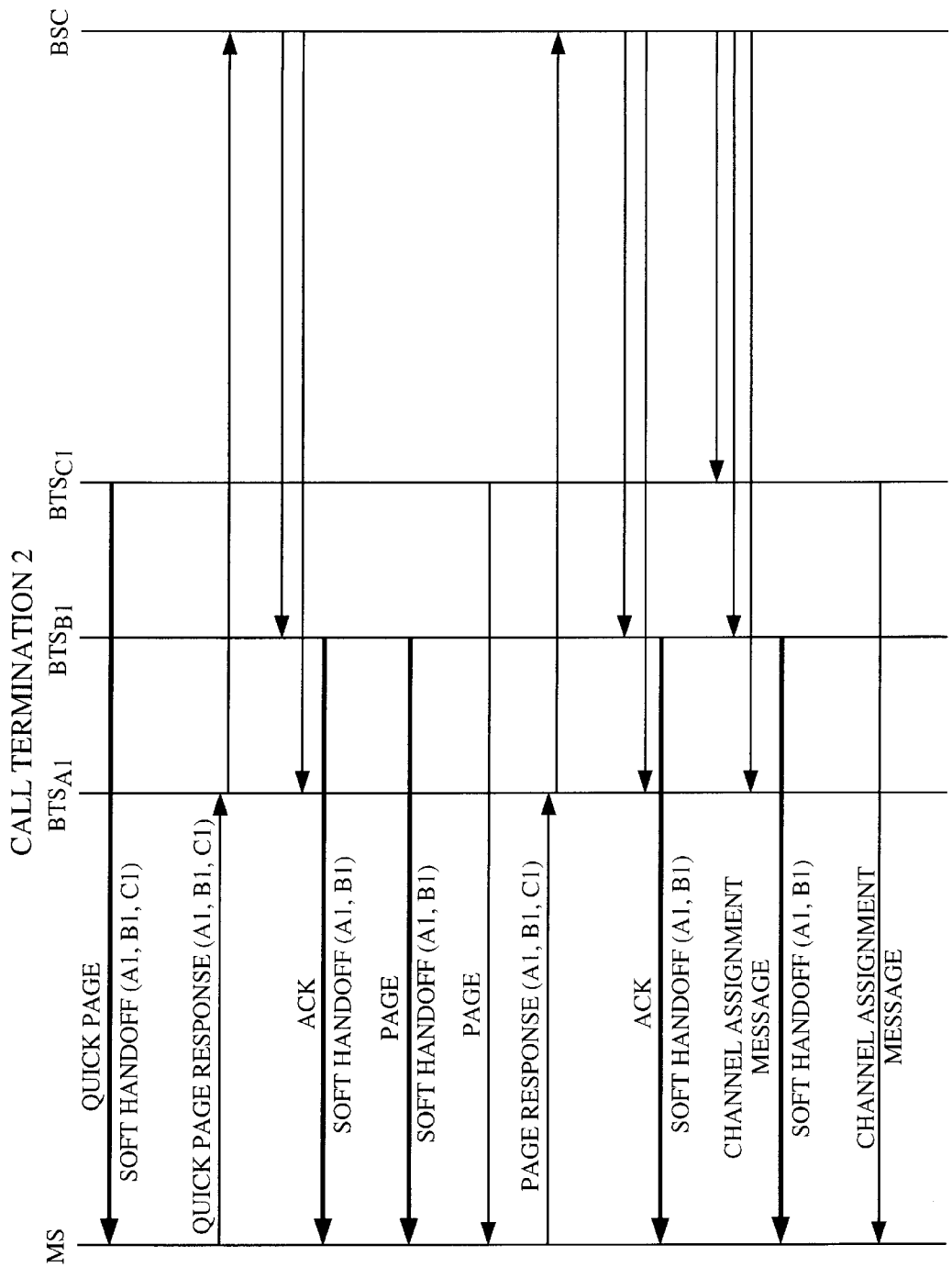
FIG. 11 is an illustrative message sequence diagram showing an alternative call termination message sequence transmitted in paging channel soft handoff between a mobile station, multiple base stations and a base station controller in accordance with a present embodiment of the invention.

Referring to the illustrative drawings of FIG. 11, there is shown an example of a call termination message sequence which includes a Quick Page Response Message sent by the mobile unit to inform the base station with the strongest measured pilot signal strength, base station A1 in the example, the pilot measurement information for the mobile station. This advantageously informs the base station of the latest Active Set in which to send the Page Message. This has the advantage in that the Page Message is required to be transmitted from fewer base stations since the BSC is informed of the pilot measurement information. This is in contrast to the previous example in which the BSC was assumed to not know pilot measurement information about the mobile station and thus had to transmit the Page Message in many different base stations.

Paging Channel Soft Handoff For Synchronized Based Stations

In receiving either the Acknowledgement Message, Page Message, or the Channel Assignment Message on the F-CCCH, the mobile unit would diversity combine the signals from the base stations in soft handoff, just as is done on the Traffic Channel when the mobile unit is in soft handoff. In order for diversity combining to work correctly, all of the base stations must send out F-CCCH paging messages at the substantially same time. In the past, this has been done on the Traffic Channel by having all of the forward link frames time synchronized in their transmission. This is relatively straightforward since the Traffic Channel is a dedicated channel, and no specific control is required. Nevertheless, mobile units typically are equipped with deskew buffers to synchronize signals subject to multipath delay.

Figure 12:
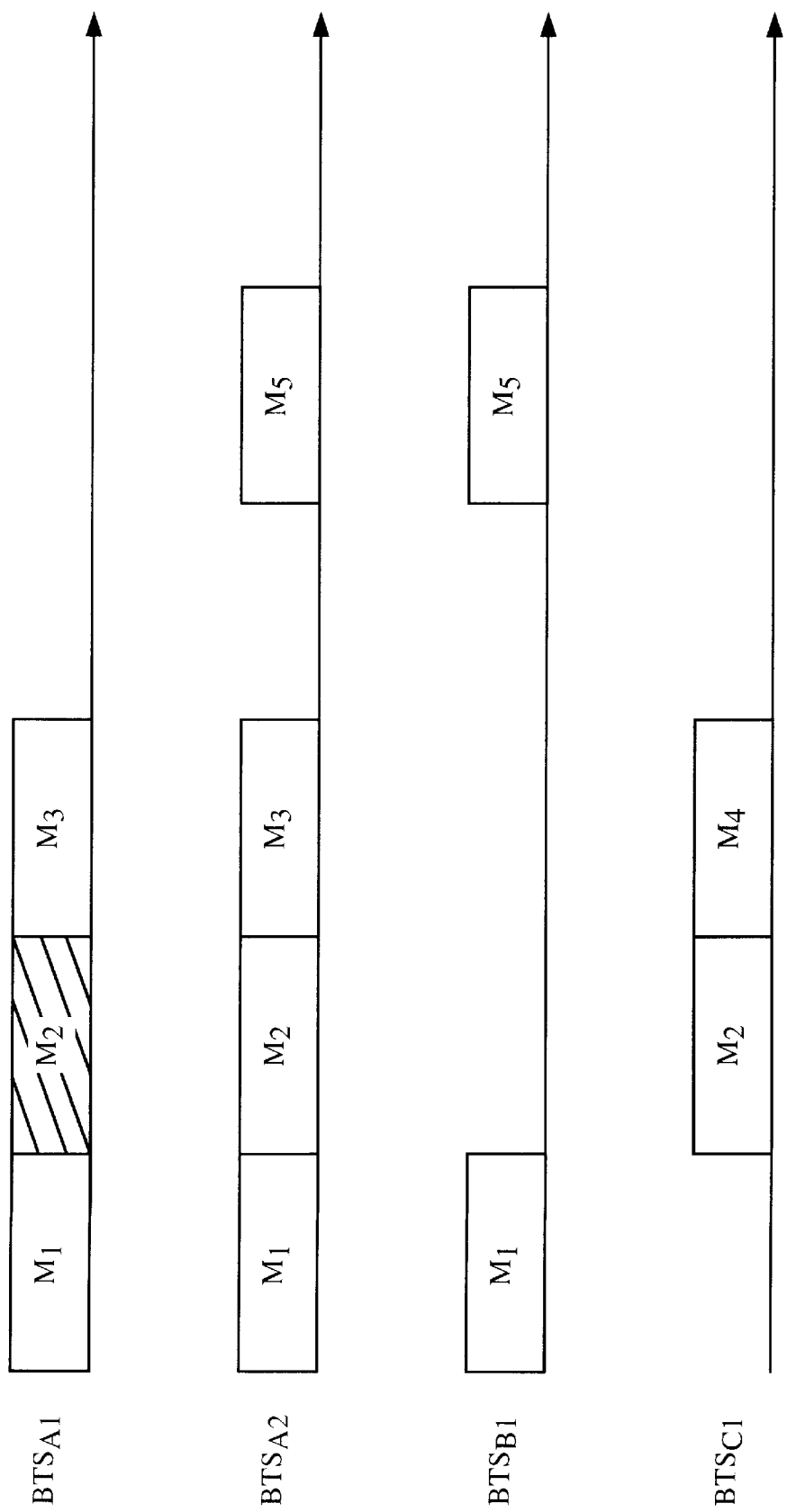
FIG. 12 is a message sequence diagram illustrating two different sets of messages transmitted in soft handoff to two different mobile units by two overlapping sets of base stations operating synchronously in accordance with a present embodiment of the invention.

The F-CCCH, however, is a common or shared channel, and the transmission of paging signals substantially simultaneously by multiple base stations in different cell regions requires coordination of their respective transmissions. For example, there may be more than one mobile unit that requires transmission of F-CCCH messages in soft handoff. Moreover, each such mobile unit may identify a different Active Set of base stations with pilot signals above a prescribed threshold value. Referring to FIG. 12 for instance, there is shown an illustrative example of two different sets of messages that are to be transmitted by two different, but overlapping sets of base stations. It will be appreciated that, in soft handoff in accordance with a presently preferred embodiment of the invention, each instance of message M1, transmitted by A1, A2 or B1 has identical information which is identically converted and modulated so that the messages can be diversity combined. The same is true for each instance of messages M2–M5 as well. In this example, M1 is to be transmitted in sectors {A1, A2, B1} and M2 is to be transmitted in sectors {A1, A2, C1}.

In a presently preferred embodiment of the invention, the BSC performs a scheduling algorithm so that a single common F-CCCH used by each base station is appropriately utilized. The base stations are those in the Active Set with the appropriate permission flags set as described in the above example. Each instance of a message is scheduled to be sent simultaneously with each other instance of the same message as shown in FIG. 12. Message scheduling information is sent to the various base stations by the BSC.

It should be noted that this invention has been described in terms of a single F-CCCH. A plurality of F-CCCH's can be used with the hashing to a particular F-CCCH based upon the mobile station's IMSI or other identity similar to that which is done with the Paging Channel in TIA/EIA-95-B. Then the messages which are sent on the F-CCCH are directed to the appropriate F-CCCH based upon the IMSI of the mobile station.

Paging Channel Soft handoff For Asynchronous Based Stations

In an alternative embodiment of the invention, the mobile unit may have to achieve synchronization of F-CCCH or F-QPCH messages transmitted by different base stations that operate asynchronously. Asynchronous base stations are those in which the timing is not necessarily aligned between them. For example, frames may offset from one base station to another.

Figure 13:
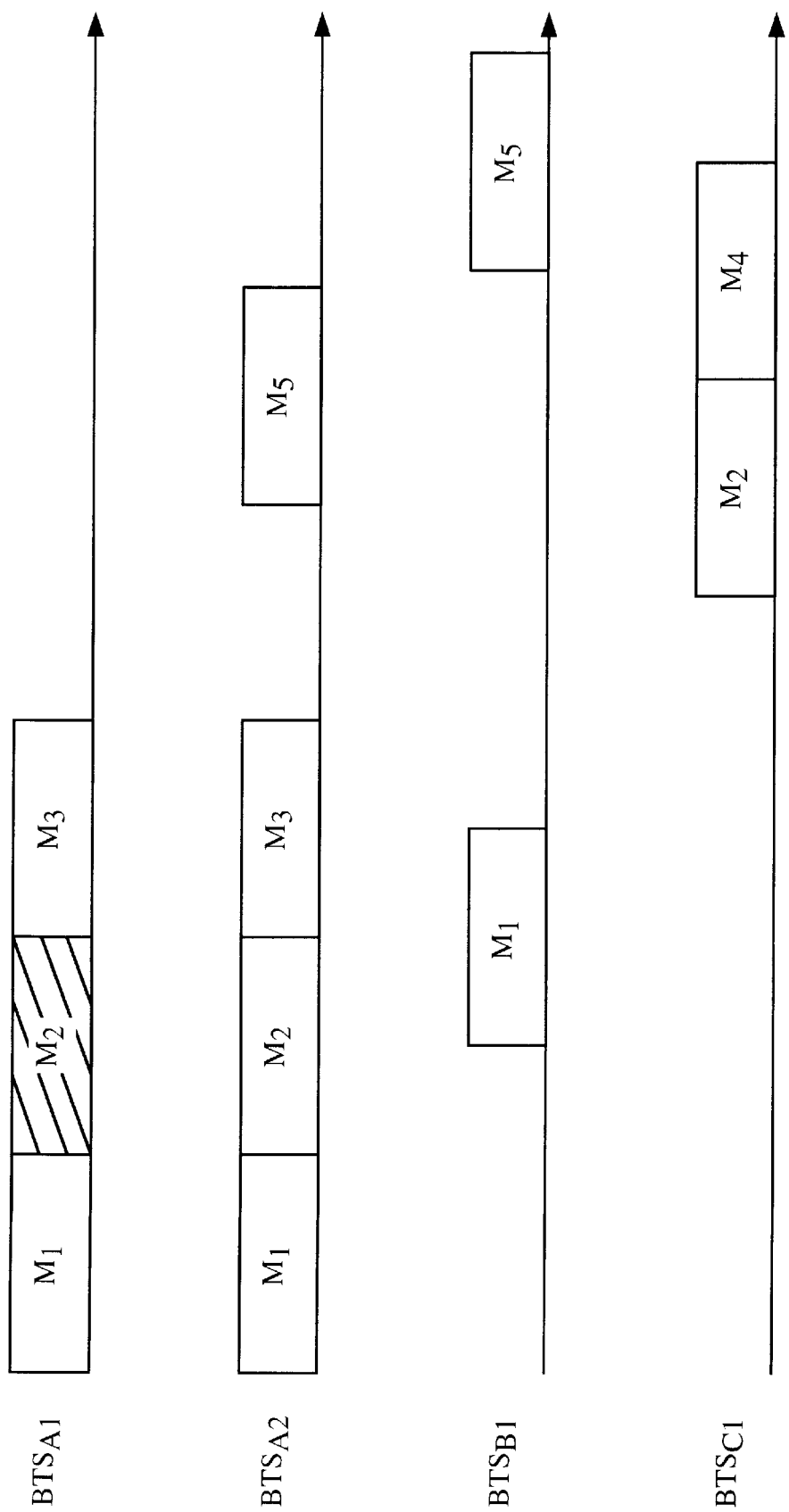
FIG. 13 is a message sequence diagram illustrating two different sets of messages transmitted in soft handoff to two different mobile units by two overlapping sets of base stations that operate asynchronously in accordance with a present embodiment of the invention.

The mobile unit must deskew the timing of messages transmitted by different asynchronous base stations before the messages can be combined to achieve diversity. The message timing diagram of FIG. 13 illustrates the transmission of messages by base stations A, B and C, where Sectors A1 and A2 are synchronized with each other, but sectors B1 and C1 are asynchronous. The messages are the same as in FIG. 12. Note that for asynchronous base stations, that the relative timing within each channel is maintained; however, one channel is skewed between channels.

In order to deskew messages received on the asynchronous paging channels of different base stations, the mobile unit implements a deinterleaver buffer with a length that is at least the maximum amount of skew between the base stations. The mobile unit is assumed to know the timing offset of the various base stations, perhaps as obtained by synchronization patterns which are embedded in the forward links of these base stations. As the mobile unit receives a symbol from a particular base station, the mobile unit does the normal receiver processing functions such as despreading, removing the orthogonal cover, demodulation in each of its rake receiver fingers, which are 40 and 42 in FIG. 3. However, deinterleaving of message information may have to be performed differently for each rake receiver finger in order to synchronize the asynchronous messages so that they can be diversity combined. More particularly, the output of every rake receiver finger which corresponds to a different base station is separately deinterleaved so that the asynchronous messages can be aligned. Referring to FIG. 3, this deinterleaving is performed in diversity combiner and decoder 48.

For instance, assume the example in FIG. 13 that a first mobile unit is to receive F-QPCH and F-CCCH paging channel messages from base station sectors A1, A2 and B1. Also, assume that there are four rake receiver fingers of the form 40 and 42 in FIG. 3 with two fingers being assigned for different multipaths from base station sector A1 and the remaining two fingers being assigned to A2, and B1. The mobile unit combines the signal from the two rake fingers from sector A1 as it normally does since these messages are aligned with each other. As a result there are three remaining streams, one from each of A1 (the combined signals on two fingers), A2 and B1.

For example, the mobile unit takes a given symbol from the first arriving base station message stream (combined from two multipath streams) and places it in the deinterleaver buffer. When the corresponding symbol arrives from the second base station message stream (the one having timing later than the first base station), the mobile unit takes the symbol from the deinterleaver buffer, combines it with the newly arriving symbol, and replaces the symbol into the deinterleaver buffer. When the corresponding symbol arrives from the third base station message stream (the one having timing later than the second base station), the mobile unit takes the symbol from the deinterleaver buffer, combines it with the newly arriving symbol, and replaces the symbol into the deinterleaver buffer. When all the symbols have been placed into the deinterleaver buffer from all of the base stations, the mobile unit performs the deinterleaving and then the decoding. Thus, deinterleaving and decoding are delayed until the entire symbol has arrived form all three base stations. It should be noted that the mobile unit can attempt the decoding before it has received the corresponding symbols from all base stations. This could result in a faster processing rate but with a possibly higher error rate. It should also be noted that the mobile unit may require a second deinterleaver buffer to begin buffering a received symbol from the next interleaver frame before symbols have been completely received from the previous interleaver frame. It should also be noted that there are a number of other equivalent ways to implement this which should be evident to those skilled in the art.

F-CCCH Soft Handoff With Headers Example

In yet another alternative, paging messages can have information added to them that identify a given mobile unit that is to receive the F-CCCH messages in soft handoff. This alternative approach can be quite useful, for example, when there are a large number of base stations under a BSC in soft handoff. This alternative approach also may be particularly useful when F-CCCH soft handoff must be coordinated between multiple base stations under control of different BSCs. This alternative does not require the base stations to send the same message at the same time. Rather, each mobile unit is assigned a short identifier. For example, this identifier could be a twelve-bit number. At the beginning of each message transmission from a base station, a coded version of this identifier is transmitted. It is transmitted with sufficient coding so that the mobile unit can receive the identifier correctly, even at relatively low signal levels. This coding, for example, can be a special block coded representation of the identifier so that the error rate of the identifier is low when soft handoff combining is not used. Alternatively, increased power level could be used. Other methods familiar to those skilled in the art can also be used. When receiving messages on the F-CCCH, the mobile unit first decodes the identifier and then the mobile unit attempts to receive the message. If the mobile unit is unable to demodulate and decode the message without incurring significant errors then the mobile unit maintains the code symbols in a buffer and searches for the identifier from another base station. When it receives the second indicator, it demodulates the message and combines symbols with those stored in the buffer from the first attempt. At the end, the mobile unit again determines whether the message was correctly received.

Note that the base station identifiers are not sent initially in soft handoff. Only after more than one base station is identified using such identifiers is it possible, under this approach, to combine F-CCCH messages in soft handoff.

While a particular embodiment of the invention has been described in detail, various modifications to the preferred embodiment can be made without departing from the spirit and scope of the invention. Thus, the invention is limited only by the appended claims.

What is claimed is:

1. A method of transmission of control information between a mobile unit and a base station in spread spectrum communications system:

monitoring by a mobile unit the power level of control signals received from multiple base stations;

identifying by the mobile unit a first set of base stations for which the received power level of the received control signal exceeds a prescribed level;

sending a power measurement message from the mobile unit to at least one base station in the set that identifies the base stations in the identified first set;

sending to the mobile unit by at least one base station a message that specifies a second set of base stations that are permitted to transmit to the mobile unit in soft handoff; and communicating a control message to the mobile unit in soft handoff from multiple base stations that are members of both the first set and the second set;

wherein at least one member of the second set of base stations is determined based on independent soft handoff information other than the information provided by the mobile unit relating to the power level of control signals.

2. The method of claim 1 wherein the control signals monitored by the mobile unit are pilot signals.

3. The method of claim 1 wherein the control messages communicated to the mobile unit includes a paging message.

4. The method of claim 1 wherein the control message communicated to the mobile unit includes a forward common control channel message.

5. The method of claim 1 wherein the control message communicated to the mobile unit includes a paging message and a forward common control channel message.

6. The method of claim 1 further including:

designating time intervals during which a paging message may be sent to the mobile unit; and wherein communicating a control message to the mobile unit in soft handoff from multiple base stations involves communicating a paging message during a designated time interval.

7. The method of claim 1 further including:

designating time intervals during which a paging message may be sent to the mobile unit and designating time intervals during which a forward common control channel message may be sent to the mobile unit; and wherein communicating a control message to the mobile unit in soft handoff from multiple base stations involves communicating a paging message during a designated time interval and communicating a forward common control channel message during a designated time interval.

8. The method of claim 1 further including:

the mobile unit and at least one base station separately designating the same time intervals during which a control message may be sent to the mobile unit; and wherein communicating a control message to the mobile unit in soft handoff from multiple base stations involves communicating a paging message during a designated time interval.

9. The method of claim 1 further including:

the mobile unit and at least one base station separately designating the same time intervals during which a control message may be sent to the mobile unit based at least in part upon identity of the mobile unit; and wherein communicating a control message to the mobile unit in soft handoff from multiple base stations involves communicating a paging message during a designated time interval.

10. The method of claim 1 further including:

sending a mobile unit identification message from the mobile unit to at least one base station in the set that identifies the mobile unit to the at least one base station;

designating time intervals during which a control message may be sent to the mobile unit based at least in part upon identity of the mobile unit;

wherein designating time intervals involves the mobile unit and at least one base station separately arriving at the same time intervals based at least in part upon identity of the mobile unit.

11. The method of claim 1 further including:
entering a sleep mode by the mobile unit when the mobile unit does not have an assigned traffic channel and temporarily awakening from the sleep mode by the mobile unit from time to time when the mobile unit does not have an assigned traffic channel;
wherein communicating a control message to the mobile unit in soft handoff occurs while the mobile unit is temporarily awake when the mobile unit does not have an assigned traffic channel.

12. The method of claim 1 further including:
designating time intervals during which a control message may be sent to the mobile unit;
entering a sleep mode by the mobile unit when the mobile unit does not have an assigned traffic channel and temporarily awakening from the sleep mode by the mobile unit during a designated time interval;
wherein communicating a control message to the mobile unit in soft handoff occurs while the mobile unit is temporarily awake during a designated time interval when the mobile unit does not have an assigned traffic channel.

13. The method of claim 1 further including:
designating time intervals during which a control message may be sent to the mobile unit;
wherein communicating a control message to the mobile unit in soft handoff from multiple base stations occurs during a designated time interval.

14. The method of claim 1,
wherein the control message includes a quick page message and a corresponding forward common control channel message; and further including:
designating time intervals during which a quick page message and a corresponding forward common control channel message may be sent to the mobile unit;
wherein communicating a control message to the mobile unit in soft handoff from multiple base stations may occurs during the time intervals designated for quick page messages and corresponding forward common control channel messages.

15. A method of transmission of control information between a mobile unit and a base station in spread spectrum communications system:
monitoring by a mobile unit the power level of control signals received from multiple base stations;
identifying by the mobile unit an Active Set of base stations based upon power levels of the received control signals;
sending messages from the mobile unit to at least one base station that identify the Active Set;
sending a handoff permission message from at least one base station to the mobile unit that specifies a set of base stations that are permitted to transmit control signals to the mobile unit in soft handoff; and
communicating a control message to the mobile unit in soft handoff from multiple base stations that are members of both the Active Set and the set of permitted base stations;
wherein at least one member of the permitted set of base stations is determined based on independent soft handoff information other than the information provided by the mobile unit relating to the power level of control signals.

16. The method of claim 15 further including:
designating time intervals during which a control message may be sent to the mobile unit;
wherein communicating a control message to the mobile unit in soft handoff from multiple base stations occurs during a designated time interval.

17. The method of claim 15 further including:
identifying by the mobile unit an Candidate Set of base stations based upon power levels of the received control signals; and
sending messages from the mobile unit to at least one base station that identify the Candidate Set;
wherein membership of the mobile unit Active Set and the Candidate Set may change between a time when the mobile unit sends a message that identifies the active Set or the Candidate Set and the time when a control message is communicated in soft handoff.

18. The method of claim 15 further including:
designating time intervals during which a control message may be sent to the mobile unit;
entering a sleep mode by the mobile unit when the mobile unit does not have an assigned traffic channel and temporarily awakening from the sleep mode by the mobile unit during a designated time interval;
wherein communicating a control message to the mobile unit in soft handoff occurs while the mobile unit is temporarily awake during a designated time interval when the mobile unit does not have an assigned traffic channel.

19. The method of claim 15,
wherein the control message includes a quick page message and a corresponding forward common control channel message; and further including:
designating time intervals during which a quick page message and a corresponding forward common control channel message may be sent to the mobile unit;
wherein communicating a control message to the mobile unit in soft handoff from multiple base stations may occur during the time intervals designated for quick page messages and corresponding forward common control channel messages.

20. A method of transmission of control information between a mobile unit and a base station in spread spectrum communications system:
monitoring by a mobile unit the power level of pilot signals received from multiple base stations;
identifying by the mobile unit a first set of base stations based for which the received pilot signal power level exceeds a prescribed level;
sending a message from the mobile unit to at least one base station in the set that identifies the base stations in the identified first set;
sending a handoff permission message from at least one base station to the mobile unit that specifies a set of base stations that are permitted to transmit page signals and a set of base stations that are permitted to transmit forward common control channel messages to the mobile unit in soft handoff;
designating time intervals during which a page signal and a corresponding forward common control channel message may be sent to the mobile unit;
communicating a page signal to the mobile unit from single base station during a designated time interval or from multiple base stations in soft handoff during such designated time interval depending upon overlap of the constituents of the first set and the permitted sets; and communicating a corresponding forward common control message from a single base station during a designated time interval or from multiple base stations in soft handoff during such designated time interval depending upon overlap of the of the first set and the permitted sets;

wherein at least one member of the permitted set of base stations is determined based on independent soft handoff information other than the information provided by the mobile unit relating to the power level of control signals.

* * * * *

UNITED STATES PATENT AND TRADEMARK OFFICE
CERTIFICATE OF CORRECTION

| | | |
|---|---|---|
| PATENT NO. | : 6,216,004 B1 | Page 1 of 1 |
| APPLICATION NO. | : 09/115217 | |
| DATED | : April 10, 2001 | |
| INVENTOR(S) | : Edward G. Tiedemann, Jr. and Sandip Sarkar | |

It is certified that error appears in the above-identified patent and that said Letters Patent is hereby corrected as shown below:

On the title page Item (60) should read:

Related U.S. Application Data
(60) Provisional application No. 60/090,357, filed on June 23, 1998.

Signed and Sealed this

Sixteenth Day of December, 2008

JON W. DUDAS
*Director of the United States Patent and Trademark Office*